(12) United States Patent
Datwani et al.

(10) Patent No.: US 11,714,544 B2
(45) Date of Patent: Aug. 1, 2023

(54) GESTURE DEFINITION FOR MULTI-SCREEN DEVICES

(71) Applicant: Microsoft Technology Licensing, LLC, Redmond, WA (US)

(72) Inventors: Kartik Datwani, Delhi (IN); Bhaumik Kalpesh Kaji, Uttar Pradesh (IN); Shashi Kant, Uttar Pradesh (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/912,048

(22) Filed: Jun. 25, 2020

(65) Prior Publication Data

US 2021/0405862 A1 Dec. 30, 2021

(51) Int. Cl.
*G06F 3/04883* (2022.01)
*G06F 3/14* (2006.01)
*G06F 9/445* (2018.01)

(52) U.S. Cl.
CPC ........ *G06F 3/04883* (2013.01); *G06F 3/1423* (2013.01); *G06F 9/445* (2013.01)

(58) Field of Classification Search
CPC .... G06F 3/04883; G06F 3/1423; G06F 9/445; G06F 1/1616; G06F 3/0486; G06F 3/04817; G06F 3/0488; H04M 1/0214; H04M 2250/16
See application file for complete search history.

(56) References Cited

U.S. PATENT DOCUMENTS

| | | |
|---|---|---|
| 8,588,860 B2 | 11/2013 | Sirpal et al. |
| 8,756,532 B2 | 6/2014 | Poon et al. |
| 9,317,198 B2 | 4/2016 | Kwak et al. |
| 9,557,819 B2 | 1/2017 | Anderson |
| 9,729,591 B2 | 8/2017 | Holmquist et al. |
| 2011/0310034 A1 | 12/2011 | Ouchi et al. |

(Continued)

FOREIGN PATENT DOCUMENTS

EP 2669771 A1 12/2013

OTHER PUBLICATIONS

"International Search Report and Written Opinion Issued in PCT Application No. PCT/US2021/027865", dated Jul. 21, 2021, 14 Pages.

*Primary Examiner* — Yaron Cohen

(57) ABSTRACT

A gesture definition is provided for intuitively interacting with applications on a multi-screen device. The gesture is defined by one or more user motions signaling a user intent to perform an action on an object based on a context within the multi-screen environment. Unlike traditional gestures, the defined gesture is "context aware." That is, the gesture may initiate different actions in different contexts. Actions responsive to the gesture include opening an application, sharing data between applications (e.g., cut/paste), and/or attaching files (e.g., to a mail message). App developers can define custom actions responsive to the gesture for particular applications. Avoiding cumbersome, multi-step user inputs and interactions, the actions defined for the gesture may be performed automatically. In this way, the well-defined gesture allows users to intuitively interact with applications between and among the various screens of a multi-screen device, including seamlessly opening applications, sharing data, and attaching files.

20 Claims, 28 Drawing Sheets

(56) References Cited

U.S. PATENT DOCUMENTS

| | | | |
|---|---|---|---|
| 2012/0092280 A1* | 4/2012 | Miura | G06F 1/1647 |
| | | | 345/173 |
| 2014/0372856 A1 | 12/2014 | Radakovitz et al. | |
| 2015/0212647 A1 | 7/2015 | Kim et al. | |
| 2015/0261298 A1* | 9/2015 | Li | G01H 17/00 |
| | | | 345/156 |
| 2015/0373065 A1* | 12/2015 | Holmquist | H04L 65/4084 |
| | | | 715/753 |
| 2018/0074594 A1 | 3/2018 | Herz | |
| 2019/0155394 A1 | 5/2019 | Bedikian et al. | |
| 2019/0294322 A1 | 9/2019 | Govil et al. | |

* cited by examiner

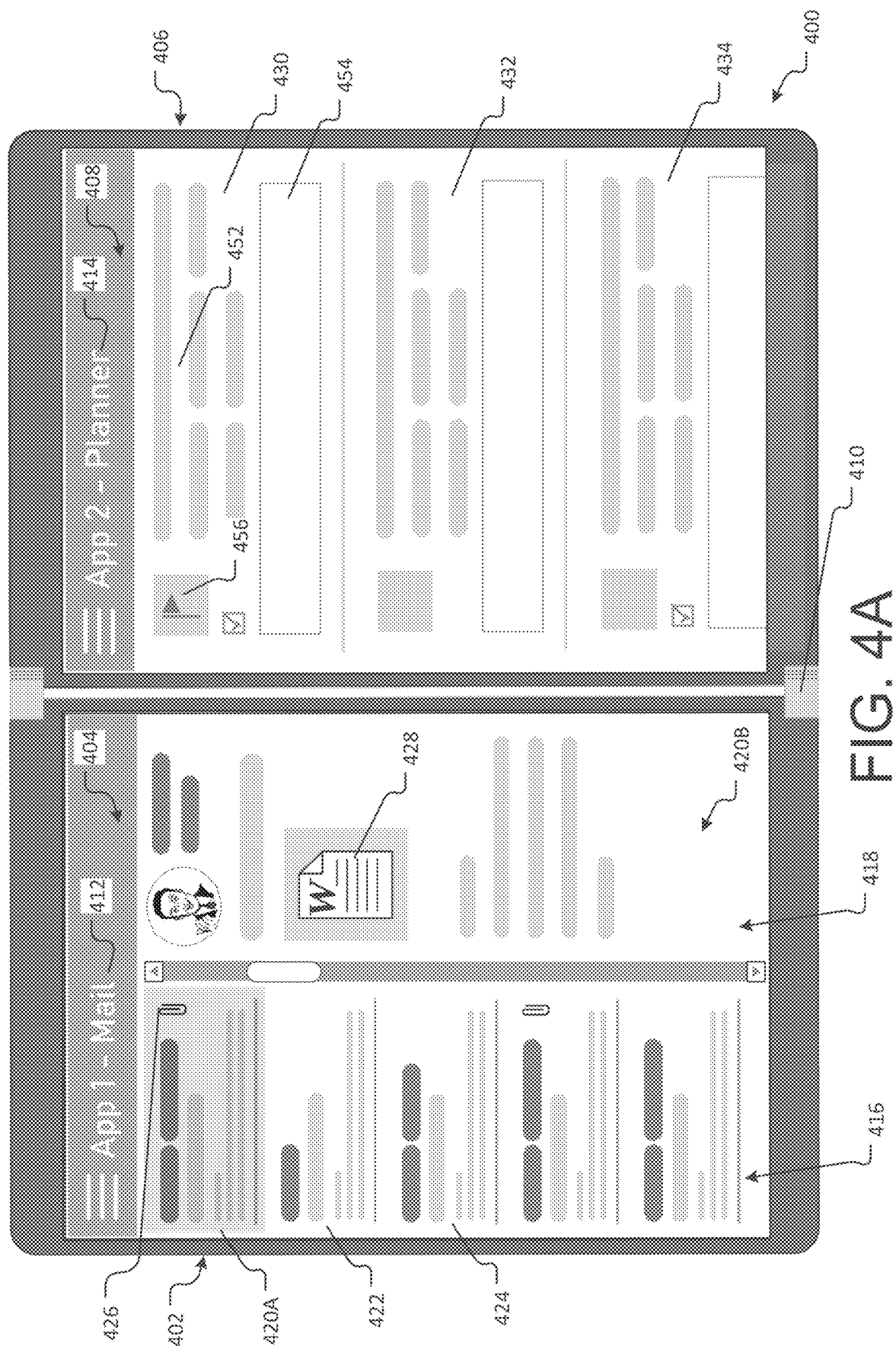

GESTURE DEFINITION FOR MULTI-SCREEN DEVICES

BACKGROUND

Handheld devices with dual or multiple screens are becoming more broadly available to end user in the general public. Such devices allow users to access multiple applications via multiple screens at the same time. However, user interactions with such devices are not well defined. Thus, users are unable to easily or intuitively open applications, share data between applications, and/or attach files when using these multi-screen devices. That is, while such devices are configured to open multiple applications at the same time, users are unable to readily interact with and/or between the multiple open applications. For instance, users are required to provide multiple inputs (e.g., taps, clicks, touches) to multiple screens to move an application icon onto a second screen, open an application, perform a particular action within the application, and/or share data between applications. Such multiple inputs are not only frustrating to users but utilize additional CPU cycles and/or memory to process and execute.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In aspects, the present methods and systems define a gesture for intuitively interacting with applications on a multi-screen device. A "gesture" may be defined as one or more user motions (or user inputs) signaling a user intention to perform an action on an object based on a context. That is, unlike traditional gestures (e.g., a swipe or a pinch), the gesture described herein is "context aware." Thus, the gesture may initiate different actions in different contexts. Moreover, app developers for various applications installed on multi-screen devices are able to define custom actions responsive to the gesture. For instance, actions responsive to the gesture can include opening an application, sharing data between applications (e.g., cut/paste), and/or attaching files (e.g., to a mail message). Avoiding cumbersome, multi-step user inputs and interactions, the defined actions responsive to the gesture may be performed automatically. In this way, the well-defined gesture described herein allows users to intuitively interact with applications between and among the various screens of a multi-screen device, including seamlessly opening applications, sharing data, and attaching files. Moreover, by reducing the user inputs required to interact with applications in a multi-screen environment, processing resources (e.g., CPU cycles, memory) as well as device resources (e.g., battery power and/or battery life) are conserved.

In aspects, a computer-implemented method for performing an action responsive to a gesture on a multi-screen device. The method includes receiving a definition for the gesture. The method further includes detecting the gesture on a first screen of the multi-screen device and identifying an object associated with the gesture in the first screen. Additionally, the method involves determining an application context of a second screen of the multi-screen device and, based on the application context and responsive to the gesture, performing an action on the object in the second screen of the multi-screen device.

In further aspects, a system having a processor and memory storing computer-executable instructions is provided. When the computer-executable instructions are executed by the processor, the system performs operations. The operations include receiving a definition for a gesture, where the definition for the gesture includes at least one user motion. The operations further include detecting the gesture on a first screen of the multi-screen device and identifying an object associated with the gesture in the first screen. Additionally, the operations include determining an application context of a second screen of the multi-screen device and, based on the application context and responsive to the gesture, performing an action on the object in the second screen of the multi-screen device.

In still further aspects, a computer storage medium is provided. The computer storage medium stores computer-executable instructions that, when executed a processor, cause a computer system to perform operations. The operations include receiving a definition for a gesture. The operations further include detecting the gesture on a first screen of the multi-screen device and identifying an object associated with the gesture in the first screen. Additionally, the operations include determining an application context of a second screen of the multi-screen device and, based on the application context, retrieving a definition for a custom action responsive to the gesture. The operations also include performing the custom action on the object in the second screen of the multi-screen device.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 4A-4D depict a third example of a gesture and action on a dual-screen device in accordance with examples of the present disclosure.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In aspects, multi-screen devices allow users to access multiple applications via multiple screens at the same time. However, user interactions with such devices are not well defined. Thus, users are unable to easily or intuitively open applications, share data between applications, and/or attach files on these multi-screen device. That is, while such devices are configured to open multiple applications at the same time, users are unable to readily interact with and/or between the multiple open applications.

In order to address the issues identified above, the present methods and systems define a gesture for intuitively interacting with applications on a multi-screen device. A "gesture" may be defined as one or more user motions (or user inputs) signaling a user intention to perform an action on an object based on a context. An "action" is a result of the gesture, including an operation on an object such as "open," "copy and paste," "attach," and the like. Unlike traditional gestures (e.g., a swipe or a pinch), the defined gesture described herein is "context aware." Thus, the gesture may initiate different actions in different contexts. Moreover, app developers for various applications installed on multi-screen devices are able to define custom actions responsive to the gesture. For example, actions responsive to the gesture include opening an application, sharing data between applications (e.g., cut/paste), and/or attaching files (e.g., to a mail message). Avoiding cumbersome, multi-step user inputs and interactions, the actions responsive to the gesture may be performed automatically. In this way, the well-defined gesture described herein allows users to intuitively interact with applications between and among the various screens of a multi-screen device, including seamlessly opening applications, sharing data, and attaching files. Moreover, by reducing the user inputs required to interact with applications in a multi-screen environment, processing resources (e.g., CPU cycles, memory) as well as device resources (e.g., battery power and/or battery life) are conserved.

Figure 1:
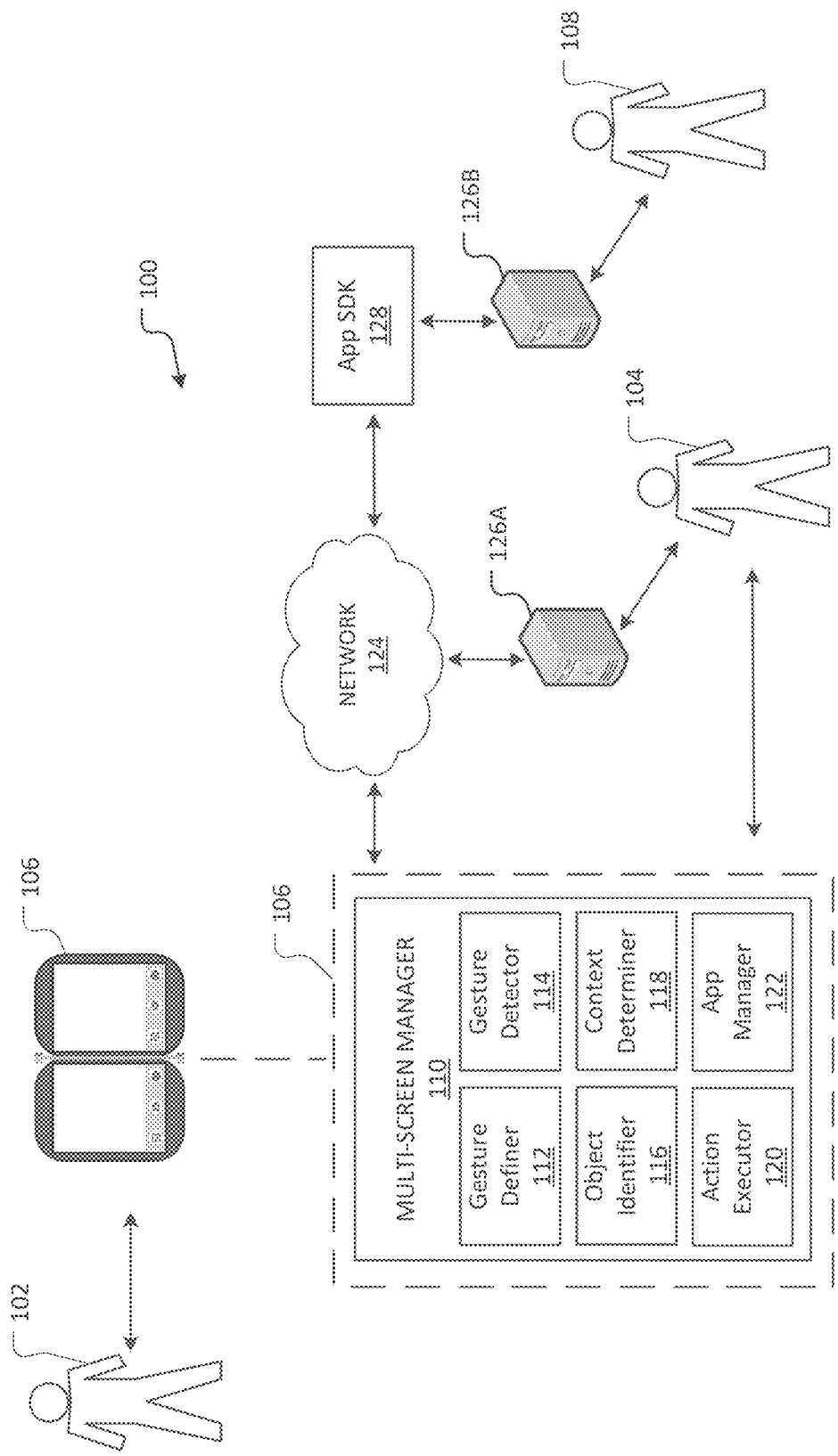
FIG. 1 illustrates an overview of an example system for defining a gesture for a multi-screen device in accordance with aspects of the present disclosure.

FIG. 1 illustrates an overview of an example system for defining a gesture for a multi-screen device in accordance with aspects of the present disclosure.

As illustrated in FIG. 1, multi-screen manager 110 may include various components for defining and executing a gesture for a multi-screen device, including a gesture definer 112, a gesture detector 114, an object identifier 116, a context determiner 118, an action executor 120, an app manager 122, and the like. In aspects, each component may communicate and pass data between the other components. The various components may be implemented using hardware, software, or a combination of hardware and software. In aspects, the various components may be executed by an operating system of a multi-screen client computing device (e.g., multi-screen device 106). As used herein, a "multi-screen device" may be a computing device associated with two or more screens communicatively coupled by an electronic connector (e.g., a hinge, a magnetic joint, a malleable material, a wire, and the like). For instance, the multi-screen device may be a portable dual-screen device that is foldable at the electronic connector. As should be appreciated, a multi-screen device may be held in a number of different orientations by a user. As an example, a dual screen device may be in a side-by-side orientation (e.g., a first screen is to the left or right side of a second screen) or in an above-below orientation (e.g., a first screen is above or below a second screen). In aspects, the displays associated with the various screens may be oriented such that text is displayed vertically regardless of device orientation.

In aspects, the multi-screen manager 110 may be configured to receive a definition of a gesture (e.g., from a system developer 104), detect the gesture on a multi-screen device 106 (e.g., from an end user 102), determine a device context associated with the gesture (e.g., based on an application environment of the device), identify an object at or near a location of the gesture on the multi-screen device 106, perform an action on the object in response to the gesture based on the device context, and manage applications (e.g., based on application SDKs 128 developed by an app developer 108).

Multi-screen manager 110 may include gesture definer 112, which may receive definitions for one or more gestures from a system developer 104. In aspects, system developer 104 may define the one or more gestures on a server 126A (or other computing system) interacting with a multi-screen device 106 via a network 124. In other aspects, system developer 104 may define the one or more gestures via an interface associated with the multi-screen device 106. For instance, system developer 104 may encode the one or more gestures at an operating system level of the multi-screen device 106. As used herein, a "gesture" may be defined as one or more user motions (or user inputs) signaling a user intent to perform an action based on a context. In some aspects, the gesture may be defined by multiple user motions. In further aspects, the gesture may initiate different actions in different contexts, as described further below.

In addition to receiving a definition for a gesture, gesture definer 112 may receive definitions for an action responsive to a detected gesture. For instance, definitions for the action may be received from a system developer 104 and/or an app developer 108 (e.g., via an app SDK 128). An "action" as used herein may include a result of the gesture, including an operation on an object such as "open," "copy and paste," "attach," and the like. "Objects" as used herein may refer to applications, files, documents, content (e.g., photos, videos, text), messages, and the like; or icons representing applications, files, documents, content (e.g., photos, videos, text), messages, and the like. In aspects, a gesture detected in a first screen of a multi-screen device may cause an action to be performed in a second screen of the multi-screen device. In further aspects, the action performed in the second screen may be based on the context of the multi-screen device.

Gesture detector 114 may receive one or more user motions to a first screen of a multi-screen device 106 to detect a gesture. For example, the one or more user motions may be detected by one or more touch sensors (e.g., capacitive or resistive sensors) on a touch-enabled multi-screen device, or may be detected by one or more motion sensors (e.g., rotational sensors or accelerometers) associated with a tilt or movement of a multi-screen device, or may be detected by one or more motion sensor cameras capturing movements of a user. For instance, for a touch-enabled device, a user motion may include a long press (e.g., a detected touch for a threshold period of time on the first screen of a multi-screen device), a double tap (e.g., two short detected touches on the first screen of a multi-screen device), a "throw" motion (e.g., a touch in a quick sideways direction on the first screen towards the second screen of a multi-screen device), or a "sideways swipe" motion (e.g., a touch from a point on the first screen to an edge of the first screen adjacent to the second screen), and the like. As should be appreciated, depending on the orientation of the multi-screen device, a "sideways" direction is a direction from a first screen towards a second screen, e.g., from left-to-right or right-to-left when the device is in a side-by-side orientation; or from above-to-below or below-to-above when the device is in an above-below orientation. In some cases, a "throw gesture" may be defined by multiple user motions, e.g., a long press and then a throw motion. In other cases, a "throw gesture" may be defined by a single user motion, e.g., the throw motion. For devices without touch-enabled screens (or with multiple sensor modes), a gesture may be detected by a motion sensor such as a rotational sensor or an accelerometer (e.g., a short downward movement of the device and then a swift sideways movement of the device in either direction), or may be detected by motion sensor cameras (e.g., a short palm down hand motion and then a swift sideways hand motion in either direction). As should be appreciated, the user motions and/or device movements described above are not intended to be limiting and a gesture may be defined as one or more user motions and/or device movements, or any combination thereof.

In further aspects, gesture detector 114 may detect a location associated with the gesture within the first screen. For example, for capacitive touch sensors, when a conductive object such as a user's finger or other tool (e.g., stylus) makes contact with the first screen, there is a change in a local electrostatic field at the position of the touch on the first screen. This change in capacitance acts as a trigger for detecting the touch at the location. For resistive touch sensors, when a user's finger or other tool (e.g., stylus) makes contact with the first screen, conductive layers within the first screen come into contact thereby causing a voltage drop at the point (e.g., x/y coordinates) of the contact. In aspects, the first screen may further be associated with a pixel grid or an x/y coordinate map of a display area on the first screen. The contact position of the gesture detected by the touch sensor (or other sensor) may be mapped to a display location within the pixel grid or coordinate map of the display area on the first screen.

Object identifier 116 may detect an object at or near a contact position of the gesture. As detailed above, "objects" may include applications, files, documents, photos, videos, messages, and the like; or icons representing applications, files, documents, photos, videos, messages, and the like. Objects may be displayed in any screen of the multi-screen device 160. Additionally, each object may be associated with a display location within the pixel grid (or coordinate map) of a display area of a screen of the multi-screen device. When the contact position of the gesture substantially matches the display location of an object, the object may be detected at or near the gesture.

Context determiner 118 may determine a device context in response to detecting a gesture. In aspects, a "device context" may refer to screen states of a multi-screen device 106. The multi-screen device may comprise at least a first screen in which a gesture is detected and a second screen. The device context refers to the screen states of one or more screens of the multi-screen device. For example, a screen state may refer to a "resting state" or an "open state." In a resting state, there are no open application in the screen; whereas in an open state, an application is open in the screen. In aspects, an application is "open" when the application has been launched and is available for user interaction within a screen of a multi-screen device. In the resting state, while no applications may be open, the screen may comprise system functionalities, such as date/time features, object icons, system icons (e.g., device settings), etc. For instance, the screen states for a dual-screen device may include a first screen state in combination with a second screen state. In this case, the first screen state is one of the resting state (the first screen having no open applications) or the open state (the first screen having a first open application), and the second screen state is one of the resting state (the second screen having no open applications) or the open state (the second screen having a second open application). For multi-screen devices having more than two screens, each screen may be either in a resting state or an open state, as described above. By way of example, both the first screen and the second screen may be in a resting state, the first screen may be in a resting state and the second screen may be in an open state, the first screen may be in an open state and the second screen may be in a resting state, or both the first screen and the second screen may be in an open state.

In addition to determining a device context, context determiner 118 may determine an application context of the multi-screen device. For screens in an open state, the "application context" refers to a particular application that is open on the screen as well as a state of the open application. For instance, the application context may refer to a type of application, such as a mail application, a document application, a presentation application, a calendar application, a task application, and the like. More specifically, the application context may refer to a particular application of an application type (e.g., Outlook® or Gmail® of a mail application type). Still more specifically, the application context may refer to the state of the particular application (or application type) that is open. An application state may refer to the feature of the application that is being accessed. For instance, for a mail application with an open interface displaying an inbox, the application state may be "inbox state." Alternatively, for a mail application with an open interface displaying sent items, the application state may be "sent state." Further still, for a mail application with an open interface for composing a mail message, the application state may be "compose state." As described further below, an action performed in response to a gesture may be defined by an app developer 108 for a particular application context. For instance, the action may be defined in a software development kit (SDK) 128 for the particular application for a particular application state. That is, the developer may define different actions for different application states of a particular application. Collectively, the device context and the application context may be referred to herein as "context."

Based on the identified object and the determined context, action executor 120 may perform an action on an object. As noted above, a gesture may be received in a first screen of a multi-screen device. An object may be determined to have a display location at or near a contact position of the gesture in the first screen. Additionally, a context of the multi-screen device 106 may be determined. Based on the context, the action executor 120 may perform an action on the object in a second screen of the multi-screen device. As noted above, actions may be different for different contexts. By way of a first example, the first screen and the second screen may be in the resting state. Additionally, the object associated with the gesture in the first screen may be an application icon for a mail application. In this case, the action executor 122 may "open" the mail application in the second screen. By way of a second example, the first screen may be in an open application state with an open mail application and the second screen may be in an open application state with an open task application. The identified object may be an attachment associated with a message displayed by the mail application. Based on the context, the action executor 120 may automatically create a new task including the attachment in the planner application. As should be appreciated, based on the identified object and the context of the multi-screen device 106, different actions may be performed in the second screen. In this way, the present application provides a well-defined gesture for a multi-screen device 106 by which different actions may be performed on objects across different screens, where the actions may be defined by system developers 104 or app developers 108. Thus, based on the defined gesture and associated actions, users are able to easily and intuitively open applications, share data between applications and/or attach files within a multi-screen environment.

App manager 122 may manage applications installed on a multi-screen device 106. For instance, app manager 122 may receive and store app SDKs 128 for each application installed on the multi-screen device. App manager 122 may communicate with context determiner 118 and/or action executor 120 to provide actions defined for particular applications. As detailed above, actions on objects for an application that is open in the second screen may differ based on the particular application. That is, the present application enables app developers 108 to specify the action in the app SDK 128 for a particular application. For instance, based on an app SDK 128 for a particular mail application, when there is an open mail message, the action may be to automatically attach an object to the open mail message; alternatively, when there is not an open mail message, the action may be to automatically create a new message with the attached object. Based on an app SDK 128 for a different mail application, the action may always be to create a new message with the attached object. Based on an app SDK 128 for a particular word processing application, the action may be to automatically copy and paste an object into an open document. Based on an app SDK 128 for a particular task application, when there is an open task, the action may be to automatically attach an object to the open task; alternatively, when there is not an open task, the action may be to automatically create a new task including the attached object. Based on an app SDK 128 for a particular presentation application, the action may be to automatically copy and paste an object into a current slide of an open presentation or to copy and paste an object into a new slide of an open presentation. As should be appreciated, an app developer 108 may specify any action in response to a detected gesture for a particular application and the above examples are not intended to be limiting.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2A:
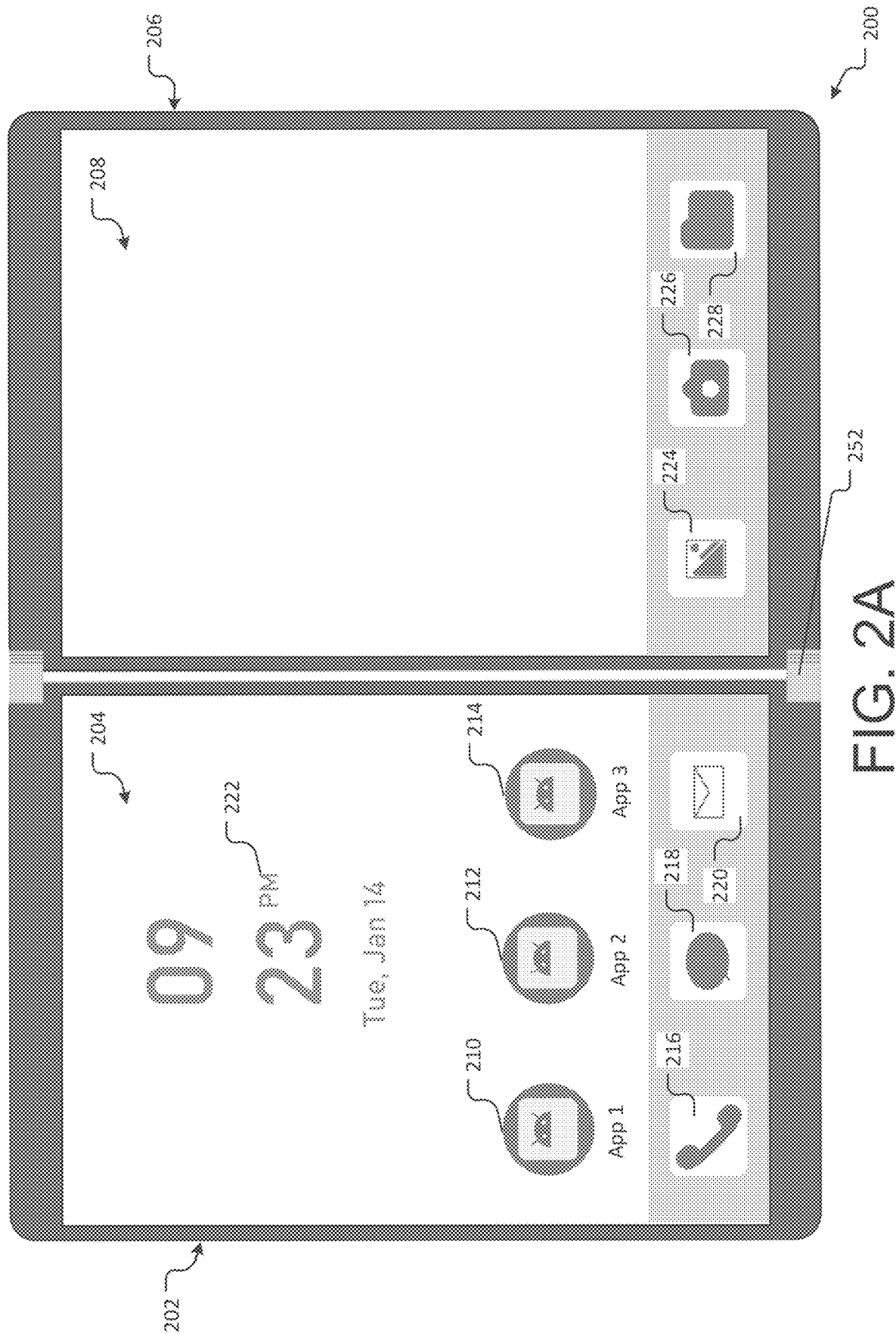
FIGS. 2A-2E depict a first example of a gesture and action on a dual-screen device in accordance with aspects of the present disclosure.

FIGS. 2A-2E depict a first example of a gesture and action on a dual-screen device in accordance with aspects of the present disclosure. FIG. 2A depicts an example of a dual-screen device in accordance with examples of the present disclosure.

Dual-screen device 200 is one embodiment of a multi-screen device (e.g., multi-screen device 106). As illustrated, dual-screen device 200 is a portable computing device including two screens communicatively coupled by an electronic connector 252 (e.g., a hinge, a magnetic joint, a malleable material, a wire, and the like). As illustrated, dual-screen device 200 includes a first screen 202 having a first display area 204 and a second screen 206 having a second display area 208. Dual-screen device 200 illustrates first screen 202 and second screen 206 in a left-to-right orientation. In aspects, first display area 204 and second display area 208 may be touch enabled. That is, first display area 204 and second display area 208 may be configured to receive user input and/or selections via contact with the first screen 202 and the second screen 206, respectively. As illustrated, first display area 204 does not display an open application. Thus, first screen 202 is in a resting state. In the resting state, first display area 204 displays icons representing three user installed applications, including first icon 210 representing a first app, second icon 212 representing a second app, and third icon 214 representing a third app. Additionally, first display area 204 displays system features such as date/time 222 and icons representing system applications or features, including a fourth icon 216 representing a call feature, a fifth icon 218 representing a text (SMS) application, and a sixth icon 220 representing a mail application.

As illustrated, second display area 208 does not display an open application. Thus, second screen 206 is in a resting state. In the resting state, second display area 208 displays icons representing system applications or features, including a seventh icon 224 representing a photo store, an eighth icon 226 representing a camera feature, and a ninth icon 228 representing a folder feature.

Figure 2B:
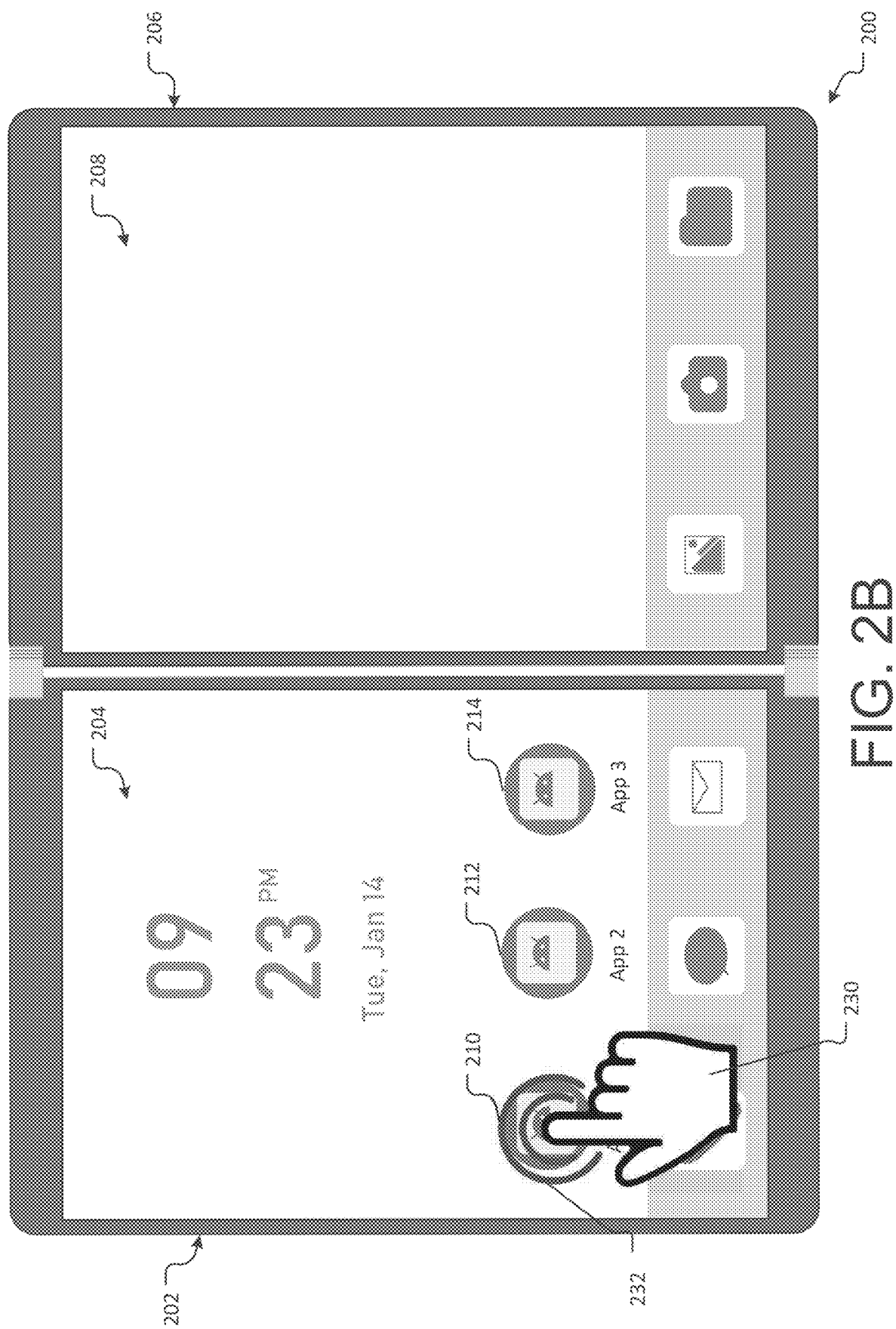

FIG. 2B depicts an example of a first user motion received on a dual-screen device in accordance with aspects of the present disclosure.

Similar to FIG. 2A, FIG. 2B illustrates a dual-screen device 200 including a first screen 202 having a first display area 204 and a second screen 206 having a second display area 208. As noted above, first display area 204 and second display area 208 may be configured to receive user input and/or selections via contact with the first screen 202 and the second screen 206, respectively. As with FIG. 2A, first screen 202 and second screen 206 are in the resting state. In the resting state, first display area 204 displays icons representing three user installed applications, including first icon 210 (partially obscured by user 230) representing a first app, second icon 212 representing a second app, and third icon 214 representing a third app.

As depicted in FIG. 2B, a user 230 may perform a first motion 232 in the first display area 204 including or otherwise in close proximity to a first icon 210 representing a first app. First motion 232 may be a touch, a tap, a double tap, or a press motion, but preferably may be a long press motion. That is, the first motion 232 may be received at a touch interface of the first screen 202 and converted into a communication; the communication may then be provided to the operating system of the dual-screen device 200. A first contact position associated with the first motion 232 may coincide with an initial display location of the first icon 210 in the first display area 204. That is, when the first contact position of the first motion 232 is at or in close proximity to the initial display location of the first icon 210, a determination may be made by the operating system that the first motion 232 signals an intention by user 230 to select the first icon 210. As noted above, an icon representing an application may be an object as defined herein.

Figure 2C:
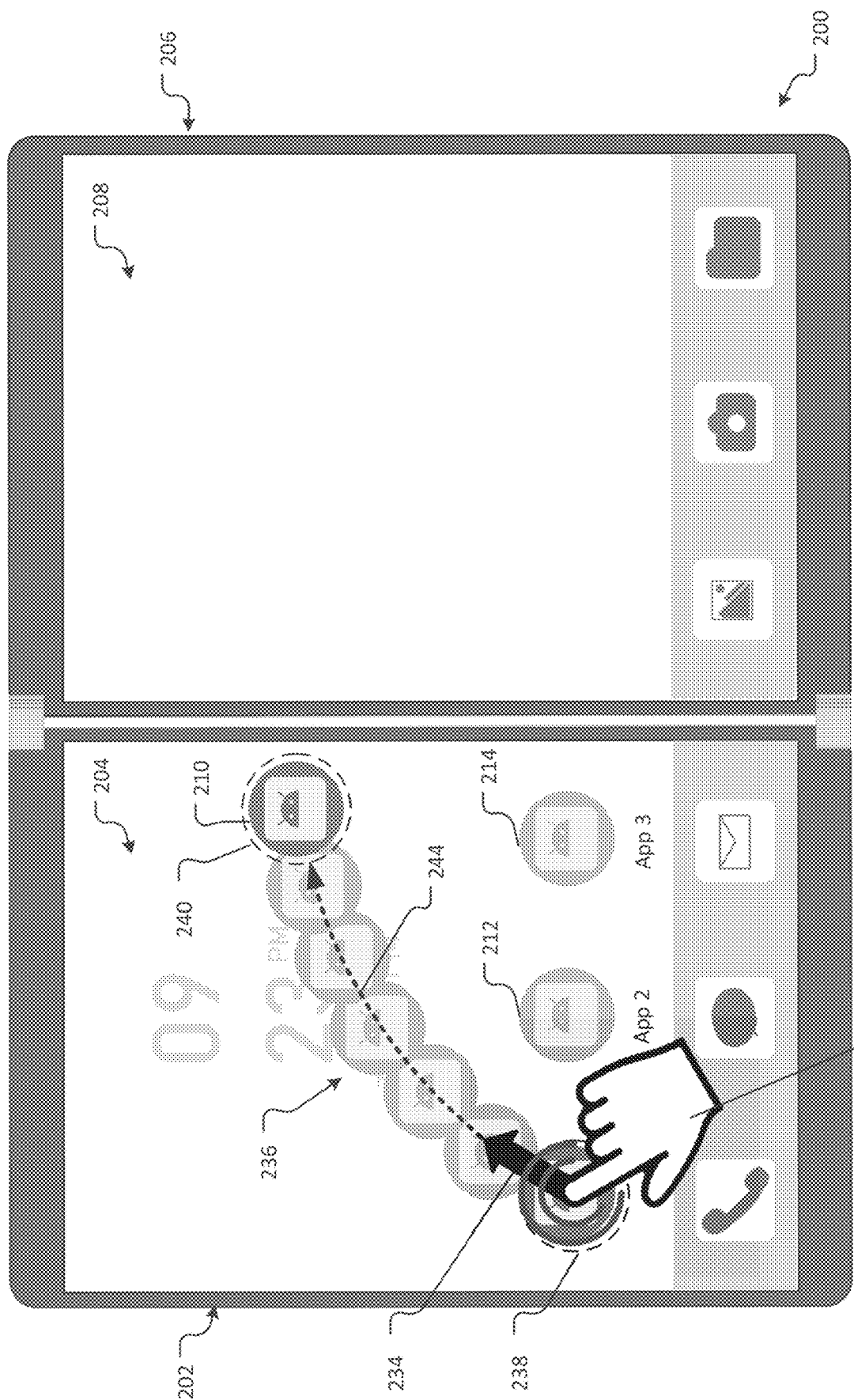

FIG. 2C depicts an example of a second user motion received on a dual-screen device in accordance with aspects of the present disclosure.

Similar to the figures above, FIG. 2C illustrates a dual-screen device 200 including a first screen 202 having a first display area 204 and a second screen 206 having a second display area 208. As noted above, first display area 204 and second display area 208 may be configured to receive user input and/or selections via contact with the first screen 202 and the second screen 206, respectively. As with the figures above, first screen 202 and second screen 206 are in the resting state. In the resting state, first display area 204 displays icons representing three user installed applications, including first icon 210 representing a first app, second icon 212 representing a second app, and third icon 214 representing a third app.

As depicted in FIG. 2C, a user 230 may perform a second motion 234 following or in conjunction with the first motion 232 (collectively, a "throw gesture" as described herein). The second motion 234 may be received in the first display area 204 including or otherwise in close proximity to the first icon 210. Second motion 234 may be a quick sideways motion (e.g., throw motion) while maintaining contact with first screen 202. The quick sideways motion (e.g., throw motion) of second motion 234 on the first screen 202 may be at an upward angle in a direction of second screen 206. The second motion 234 may be received at a touch interface of the first screen 202 and converted into a communication; the communication may then be provided to the operating system of the dual-screen device 200. A second contact position associated with the second motion 232 may initially coincide with an initial display location 238 of the first icon 210. As illustrated, initial display location 238 is represented by a dashed circle surrounding first icon 210.

When the first screen 202 receives second motion 234 following first motion 232, the operating system may recognize the throw gesture and initiate an animation 236 of the first icon 210 so as to move the first icon 210 from the initial display location 238 along a trajectory 244 to a second display location 240 in first display area 204. The trajectory 244 may be arched at an upward angle and in a direction substantially coinciding with the upward angle and direction of the second motion 234. In aspects, when the second motion 234 follows the first motion 232 within a threshold time period, a determination may be made by the operating system, for example, that that a throw gesture has been received signaling an intention by user 230 to perform an action on first icon 210. As noted above, an icon representing an application is an object. An action is a result of a gesture (e.g., the throw gesture), including operations such as "open," "copy and paste," "attach," and the like.

Figure 2D:
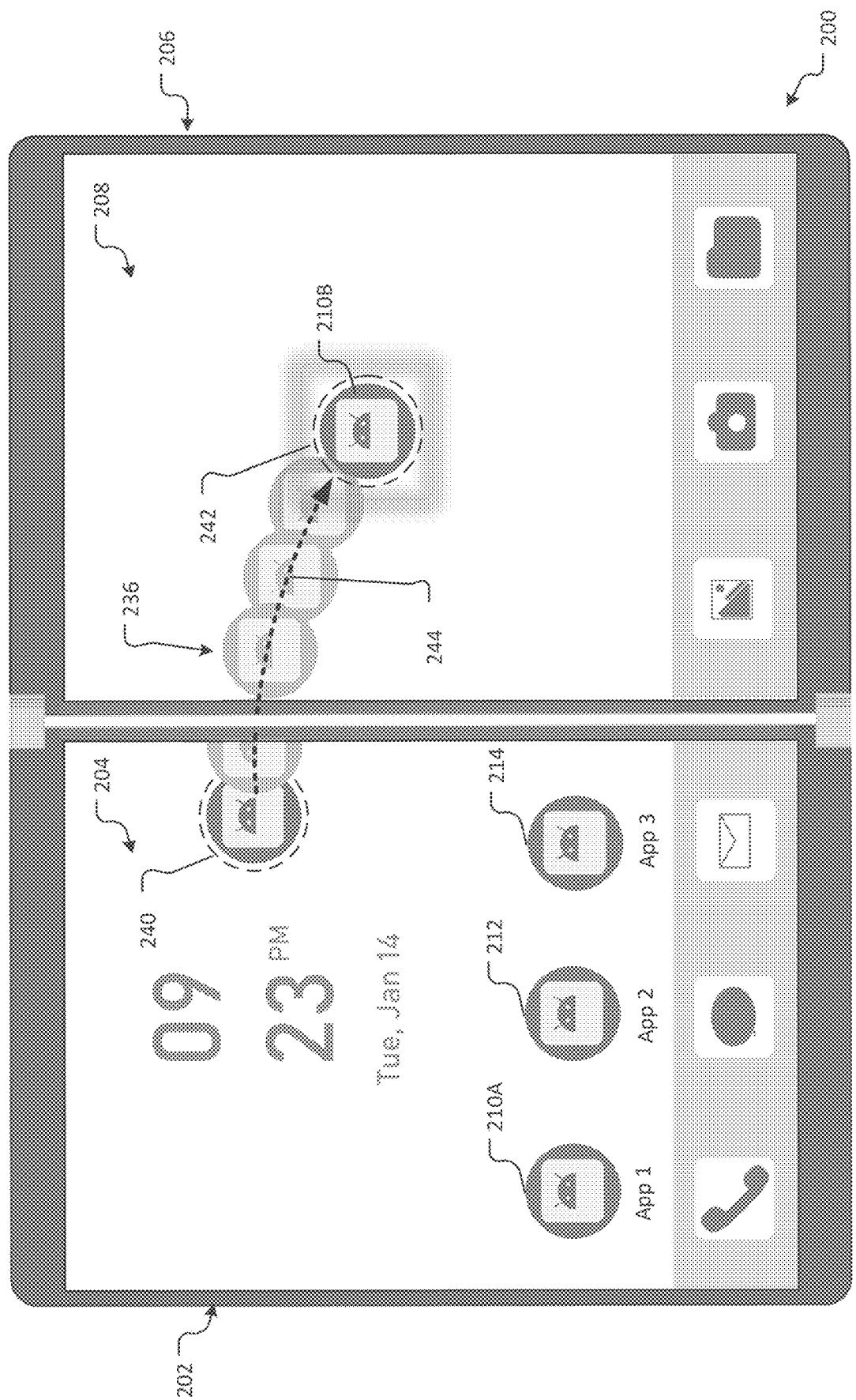

FIG. 2D depicts an example of an animation on a dual-screen device in accordance with aspects of the present disclosure.

Similar to the figures above, FIG. 2D illustrates a dual-screen device 200 including a first screen 202 having a first display area 204 and a second screen 206 having a second display area 208. As noted above, first display area 204 and second display area 208 may be configured to receive user input and/or selections via contact with the first screen 202 and the second screen 206, respectively. As with the figures above, first screen 202 and second screen 206 are in the resting state. In the resting state, first display area 204 displays icons representing three user installed applications, including first icon 210A representing a first app, second icon 212 representing a second app, and third icon 214 representing a third app. In some cases, when animation 236 moves first icon 210 along trajectory 244 to second display area 208, first icon 210 may no longer be displayed in first display area 204. Alternatively, in the illustrated example, first icon 210 is displayed in the first display area 204 as first icon 210A and in the second display area 208 as first icon 210B.

FIG. 2D illustrates a continuation of the animation 236 from the first display area 204 onto the second display area 208. As illustrated, the animation 236 portrays the first icon 210 moving from the second display location 238 along trajectory 244 to a final display location 242 in second display area 208. That is, when the second motion 234 follows the first motion 232 within a threshold time period, a determination may be made by the operating system, for example, that that a throw gesture has been received signaling an intention by user 230 to perform an action on first icon 210. As noted above, an icon representing an application is an object. An action is a result of a gesture (e.g., the throw gesture), including operations such as "open," "copy and paste," "attach," and the like.

Figure 2E:
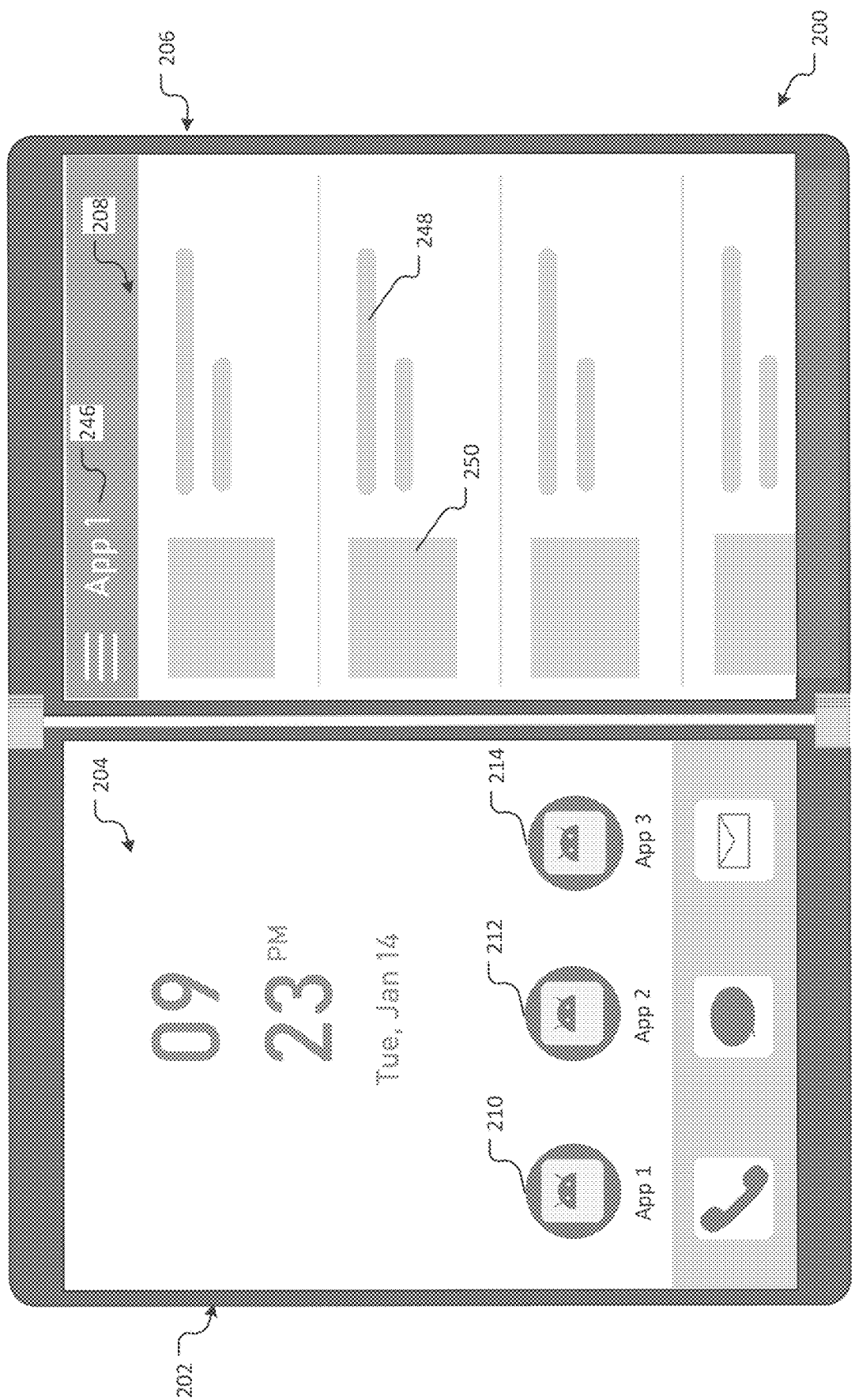

FIG. 2E depicts an example of an action performed on an object on a dual-screen device in accordance with aspects of the present disclosure.

Similar to the figures above, FIG. 2E illustrates a dual-screen device 200 including a first screen 202 having a first display area 204 and a second screen 206 having a second display area 208. As noted above, first display area 204 and second display area 208 may be configured to receive user input and/or selections via contact with the first screen 202 and the second screen 206, respectively.

In this case, FIG. 2E shows the first app 246 (e.g., "App 1") opened in second display area 208. As noted above, the first app is "open" when the application has been launched and is available for user interaction within the second display area 208 of second screen 206 of dual-screen device 200. Thus, the action performed on first icon 210 in response to detecting the throw gesture was to open the first app in the second screen 206. As illustrated, the first app may be a word processing application providing text content 248 and/or image content 250, for example. Since the first app 246 is open in the second screen 206, the second screen 206 is in an open application state. Thus, the second display area 208 of second screen 206 no longer displays the first icon 210B (as shown in FIG. 2D), nor does second display area 208 display icons representing system applications or features, such as fourth icon 216 representing a call feature, fifth icon 218 representing a text (SMS) application, and sixth icon 220 representing a mail application, as illustrated in FIG. 2A. In contrast, the first screen 202 remains in the resting state, displaying first icon 210 representing the first app, second icon 212 representing a second app, and third icon 214 representing a third app.

As should be appreciated, the various methods, devices, interfaces, components, etc., described with respect to FIGS. 2A-2E are not intended to limit the systems and methods to the particular components described. Accordingly, additional topology configurations may be used to practice the methods and systems herein and/or some components described may be excluded without departing from the methods and systems disclosed herein.

Figure 3A:
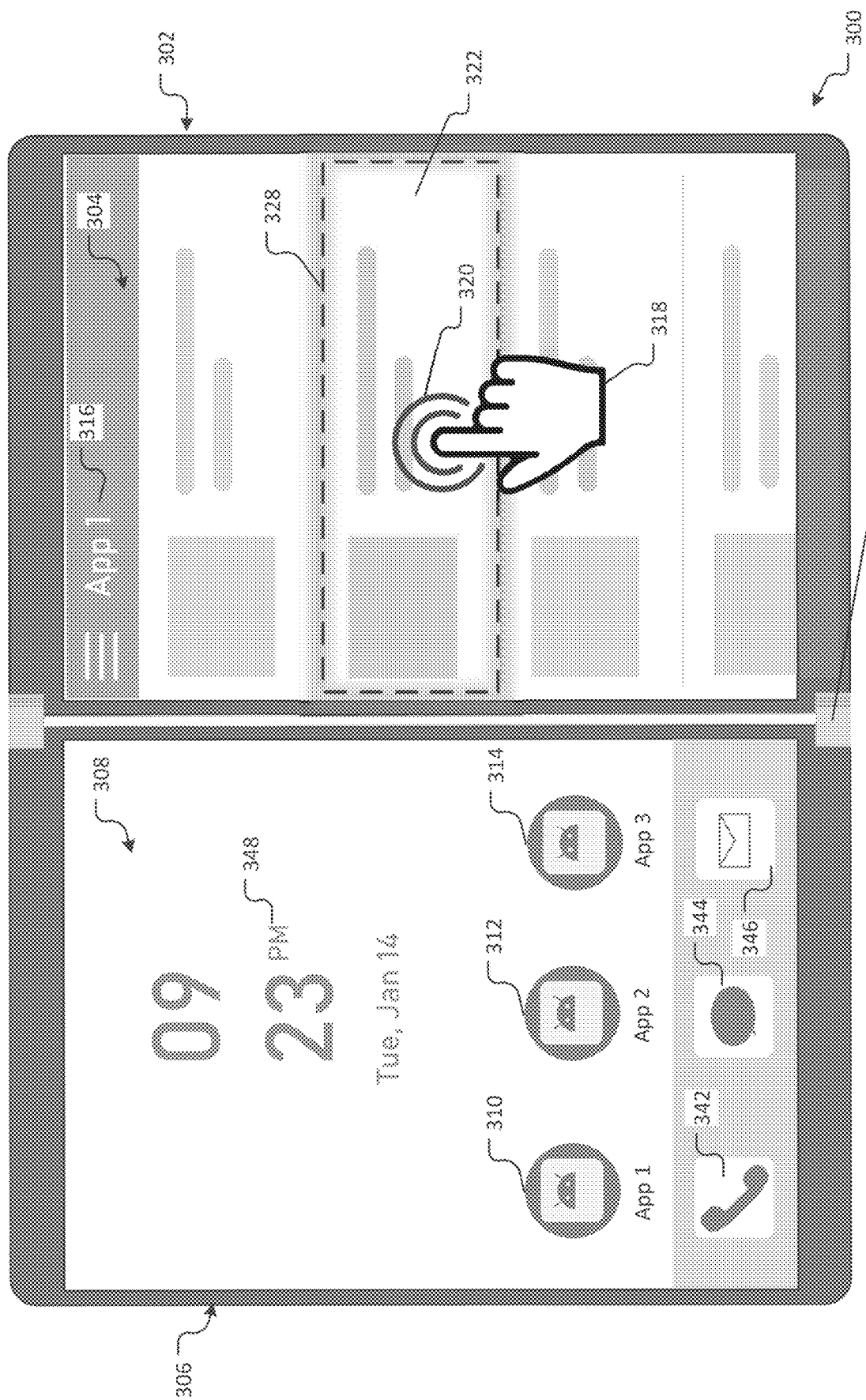
FIGS. 3A-3D depict a second example of a gesture and action on a dual-screen device in accordance with examples of the present disclosure.

FIGS. 3A-3D depict a second example of a gesture and action on a dual-screen device in accordance with examples of the present disclosure. FIG. 3A depicts a second example of a dual-screen device in accordance with examples of the present disclosure.

Similar to dual-screen device 200, dual-screen device 300 is one embodiment of a multi-screen device (e.g., multi-screen device 106). As illustrated, dual-screen device 300 is a portable computing device including two screens communicatively coupled by an electronic connector 350 (e.g., a hinge, a magnetic joint, a malleable material, a wire, and the like). As further illustrated, dual-screen device 300 includes a first screen 302 having a first display area 304 and a second screen 306 having a second display area 308. Unlike dual-screen device 200, dual-screen device 300 illustrates first screen 302 and second screen 306 in a right-to-left orientation. As should be appreciated, the orientation of the first screen relative to the second screen is based on which screen receives a gesture from the user. As the first screen receives the user gesture, the various dual-screen or multi-screen devices described herein are illustrated based on a corresponding orientation.

In aspects, first display area 304 and second display area 308 may be touch enabled. That is, first display area 304 and second display area 308 may be configured to receive user input and/or selections via contact with the first screen 302 and the second screen 306, respectively. As illustrated, first display area 304 displays an open application 316. Thus, first screen 302 is in an open application state. The application 316 may be a word processing application having content including text, one or more images, one or more videos, etc. In contrast, second display area 308 does not display an open application and, thus, second screen 306 is in a resting state. In the resting state, second display area 308 displays icons representing three user installed applications, including first icon 310 representing a first app, second icon 312 representing a second app, and third icon 314 representing a third app. Additionally, second display area 308 displays system features such as date/time 348 and icons representing system applications or features, including a fourth icon 342 representing a call feature, a fifth icon 344 representing a text (SMS) application, and a sixth icon 346 representing a mail application.

As depicted in FIG. 3A, a user 318 may perform a first motion 320 in the first display area 304 including or otherwise in close proximity to a piece of content 322. For instance, the piece of content 322 may comprise text, image(s), video(s), or a combination thereof. In aspects, the piece of content 322 may represent a synopsis of additional content, such as a book, an article, a news clip, and the like. First motion 320 may be a touch, a tap, a double tap, or a press motion, but preferably may be a long press motion. That is, the first motion 320 may be received at a touch interface of the first screen 302 and converted into a communication; the communication may then be provided to the operating system of the dual-screen device 300. A first contact position associated with the first motion 320 may coincide with an initial display location 328 of the piece of content 322 in the first display area 304. As illustrated, initial display location 328 is represented by a dashed rectangle surrounding piece of content 322. That is, when the first contact position of the first motion 320 is at or in close proximity to the initial display location 328 of the piece of content 322, a determination may be made by the operating system that that the first motion 320 signals an intention by user 318 to select the piece of content 322. As noted above, content (e.g., text, image(s), video(s)) may be an object as defined herein.

Figure 3B:
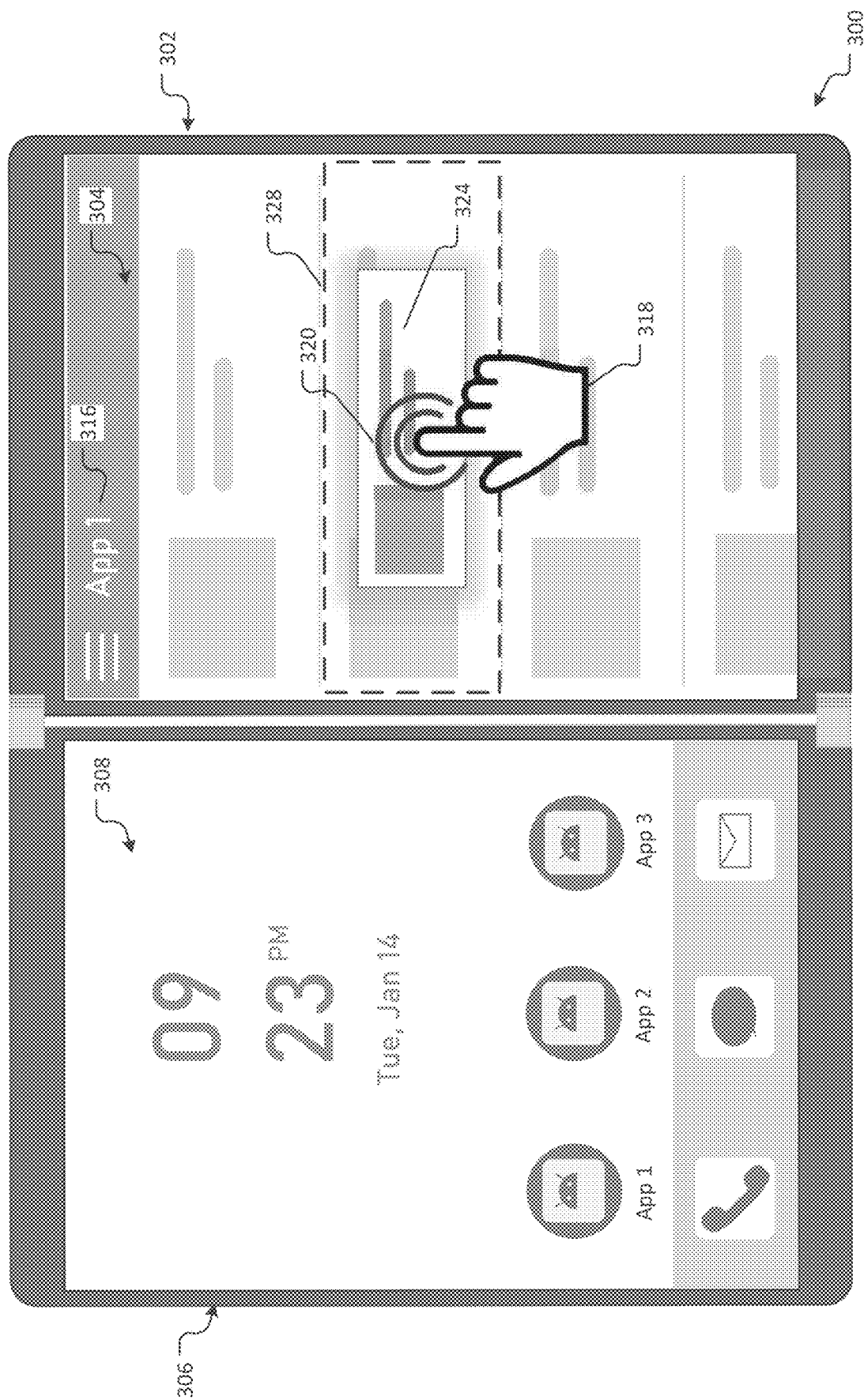

FIG. 3B depicts an example of a first user motion received on a dual-screen device in accordance with aspects of the present disclosure.

FIG. 3B illustrates a dual-screen device 300 including a first screen 302 having a first display area 304 and a second screen 306 having a second display area 308. As noted above, first display area 304 and second display area 308 may be configured to receive user input and/or selections via contact with the first screen 302 and the second screen 306, respectively. As illustrated, first display area 304 displays an open application 316. Thus, first screen 302 is in an open application state. The application 316 may be a word processing application having content including text, one or more images, one or more videos, etc. In contrast, second display area 308 does not display an open application and, thus, second screen 306 is in a resting state.

As depicted in FIG. 3B, a user 318 may perform a first motion 320 in the first display area 304 including or otherwise in close proximity to a piece of content 322. For instance, the piece of content 322 may comprise text, image(s), video(s), or a combination thereof. First motion 320 may be a touch, a tap, a double tap, or a press motion, but preferably may be a long press motion. That is, the first motion 320 may be received at a touch interface of the first screen 302 and converted into a communication; the communication may then be provided to the operating system of the dual-screen device 300. A first contact position associated with the first motion 320 may coincide with an initial display location 328 of the piece of content 322 in the first display area 304. As illustrated, initial display location 328 is represented by a dashed rectangle surrounding piece of content 322. That is, when the first contact position of the first motion 320 is at or in close proximity to the initial display location 328 of the piece of content 322, a determination may be made by the operating system that the first motion 320 signals an intention by user 318 to select the piece of content 322. As noted above, content (e.g., text, image(s), video(s)) may be an object as defined herein.

When the operating system detects an intention by user 318 to select the piece of content 322, the operating system may generate an artifact 324 representing the piece of content 322. As illustrated, the artifact 324 may be displayed as a smaller version of the piece of content 322 that is emphasized to indicate that the piece of content 322 has been selected. For example, the artifact 324 may be emphasized by shading, highlighting, bold outline, or the like.

Figure 3C:
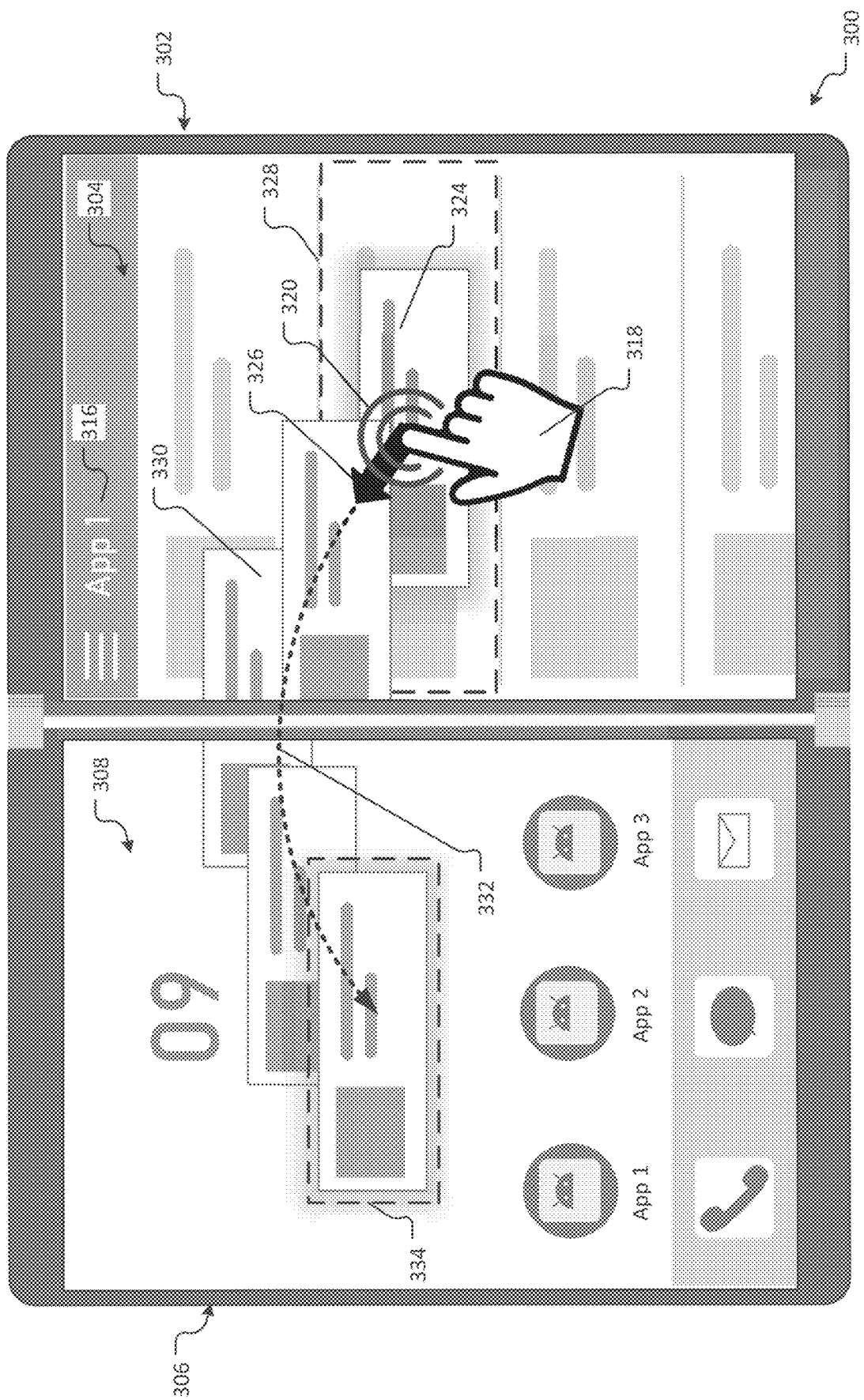

FIG. 3C depicts an example of a second user motion received on a dual-screen device in accordance with aspects of the present disclosure.

FIG. 3C illustrates a dual-screen device 300 including a first screen 302 having a first display area 304 and a second screen 306 having a second display area 308. As noted above, first display area 304 and second display area 308 may be configured to receive user input and/or selections via contact with the first screen 302 and the second screen 306, respectively. As illustrated, first display area 304 displays an open application 316. Thus, first screen 302 is in an open application state. The application 316 may be a word processing application having content including text, one or more images, one or more videos, etc. In contrast, second display area 308 does not display an open application and, thus, second screen 306 is in a resting state.

As depicted in FIG. 3C, a user 318 may perform a second motion 326 following or in conjunction with the first motion 320 (collectively, a "throw gesture" as described herein). The second motion 326 may be received in the first display area 304 including or otherwise in close proximity to the artifact 324 representing piece of content 322. Second motion 326 may be a quick sideways motion (e.g., throw motion) while maintaining contact with first screen 302. The quick sideways motion (e.g., throw motion) of second motion 326 on the first screen 302 may be at an upward angle in a direction of second screen 306. The second motion 326 may be received at a touch interface of the first screen 302 and converted into a communication; the communication may then be provided to the operating system of the dual-screen device 300. A second contact position associated with the second motion 326 may initially coincide with an initial display location 328 of the piece of content 322 in the first display area 304. As illustrated, initial display location 328 is represented by a dashed rectangle surrounding piece of content 322 and including artifact 324.

When the first screen 302 receives second motion 326 following first motion 320, the operating system may recognize the throw gesture and initiate an animation 330 of the artifact 324 so as to move the artifact 324 from the initial display location 328 along a trajectory 332 to a final display location 334 in second display area 308. The trajectory 332 may be arched at an upward angle and in a direction substantially coinciding with the upward angle and direction of the second motion 326. In aspects, when the second motion 326 follows the first motion 320 within a threshold time period, a determination may be made by the operating system that a throw gesture has been received. Furthermore, the operating system may determine that the throw gesture signals an intention by user 318 to perform an action on the piece of content 322. As noted above, a piece of content may be an object. An action is a result of a gesture (e.g., the throw gesture), including operations such as "open," "copy and paste," "attach," and the like.

Figure 3D:
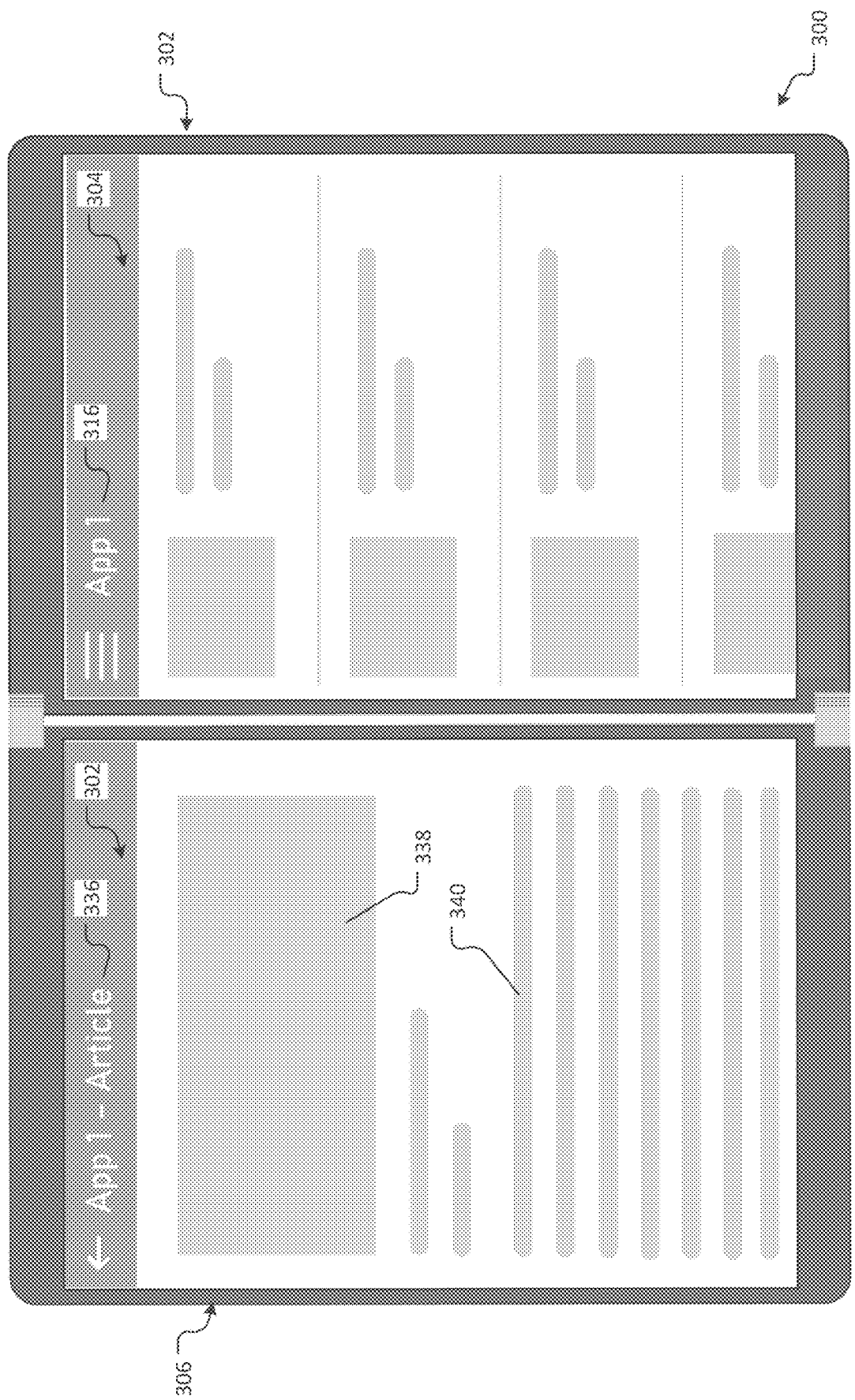

FIG. 3D depicts an example of an action performed on an object on a dual-screen device in accordance with aspects of the present disclosure.

FIG. 3D illustrates a dual-screen device 300 including a first screen 302 having a first display area 304 and a second screen 306 having a second display area 308. As noted above, first display area 304 and second display area 308 may be configured to receive user input and/or selections via contact with the first screen 302 and the second screen 306, respectively. In contrast to FIG. 3C, which shows second screen 306 in a resting state, FIG. 3D shows an open document (e.g., article 336) in second display area 308 of second screen 306. As noted above, a document is "open" when it has been launched and is available for user interaction within the second display area 308 of second screen 306 of dual-screen device 300. At least some content of article 336 corresponds to the piece of content 322; however, article 336 may also include additional content, such as image 338 and/or text 340. As noted above, the piece of content 322 may represent a synopsis of the additional content comprised in article 336.

Thus, as illustrated by FIG. 3D, the action performed on the piece of content 322 in response to detecting the throw gesture was to open a corresponding article 336 in the second screen 306. Since the article 336 is open in the second screen 306, the second screen 306 is in an open application state. Thus, in contrast to FIG. 3A, the second display area 308 of second screen 306 no longer displays icons representing user installed applications, including first icon 310, second icon 312, and third icon 314; nor does the second display area 308 display system features such as date/time 348 or icons representing system applications or features, including a fourth icon 342, a fifth icon 344, or a sixth icon 346. First screen 302 remains in the open application state, displaying application 316.

As should be appreciated, the various methods, devices, interfaces, components, etc., described with respect to FIGS. 3A-3D are not intended to limit the systems and methods to the particular components described. Accordingly, additional topology configurations may be used to practice the methods and systems herein and/or some components described may be excluded without departing from the methods and systems disclosed herein.

Figure 4B:
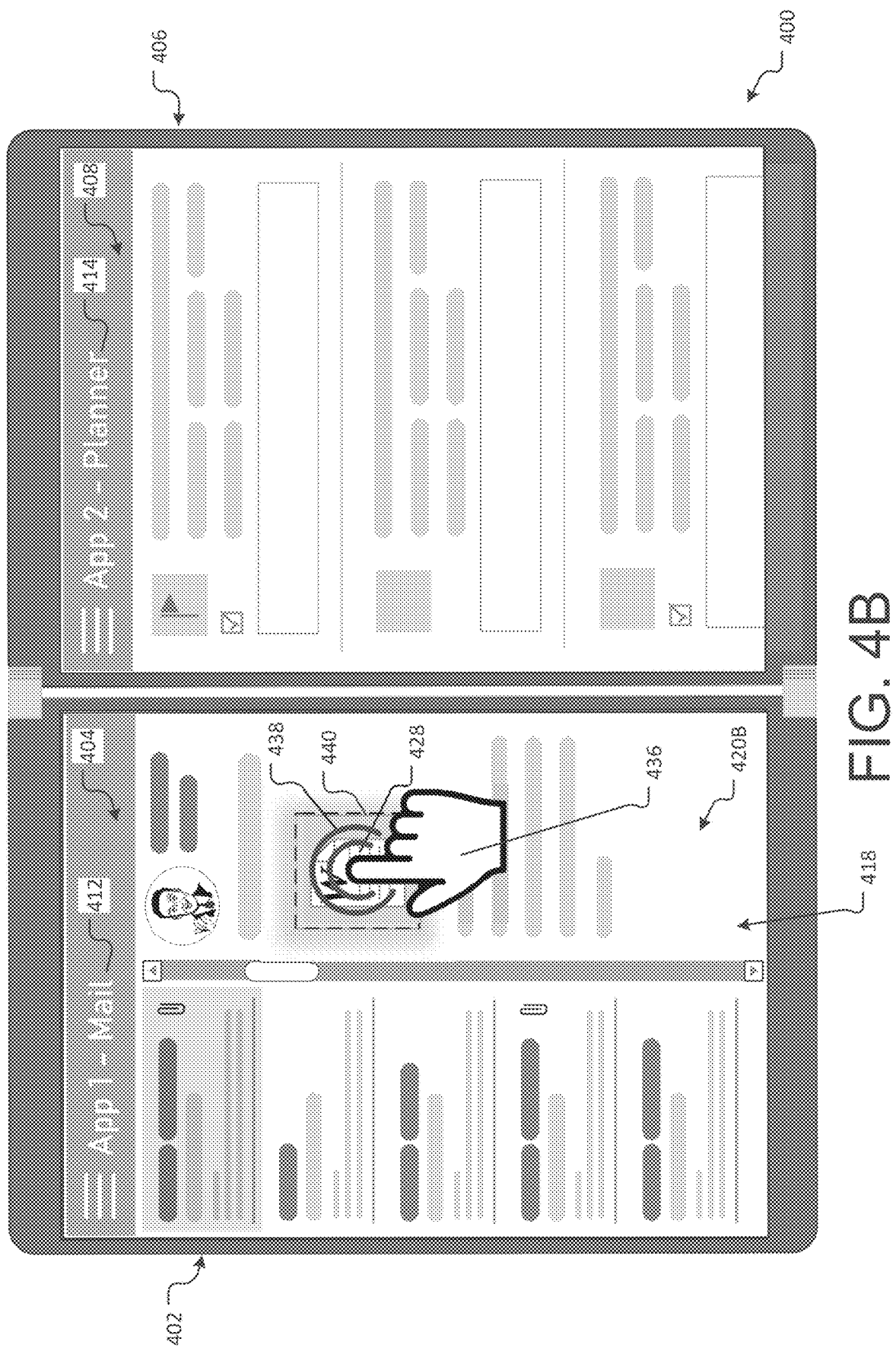

FIGS. 4A-4D depict a third example of a gesture and action on a dual-screen device in accordance with examples of the present disclosure. FIG. 4A depicts a third example of a dual-screen device in accordance with examples of the present disclosure.

Dual-screen device 400 is one embodiment of a multi-screen device (e.g., multi-screen device 106). As illustrated, dual-screen device 400 is a portable computing device including two screens communicatively coupled by an electronic connector 410 (e.g., a hinge, a magnetic joint, a malleable material, a wire, and the like). As further illustrated, dual-screen device 400 includes a first screen 402 having a first display area 404 and a second screen 406 having a second display area 408. Dual-screen device 400 illustrates first screen 402 and second screen 406 in a left-to-right orientation. As should be appreciated, the orientation of the first screen relative to the second screen is based on which screen receives a gesture from the user. As the first screen receives the user gesture, the various dual-screen or multi-screen devices described herein are illustrated based on a corresponding orientation.

In aspects, first display area 404 and second display area 408 may be touch enabled. That is, first display area 404 and second display area 408 may be configured to receive user input and/or selections via contact with the first screen 402 and the second screen 406, respectively. As illustrated, first display area 404 displays an open application (e.g., mail application 412). Thus, first screen 402 is in an open application state. Second display area 408 also displays an open application (e.g., planner application 414). Thus, second screen 406 is also in an open application state.

The mail application 412 displayed in first display area 404 provides mail messages to a user in a dual-pane interface, including a list pane 416 and a reading pane 418 within first display area 404. List pane 416 displays truncated views of a plurality of mail messages, including a least a first mail message 420A, a second mail message 422, and a third mail message 424. First mail message 420A includes an attachment icon 426 representing an attachment to the first mail message 420A. Additionally, first mail message 420A is illustrated as selected in the list pane 416 (indicated by shading). Reading pane 418 displays an expanded view of first mail message 420B, which was selected in list pane 416. First mail message 420B is displayed with a document icon 428 representing the attachment to first mail message 420B.

The planner application 414 displayed in second display area 408 may aid a user in organizing tasks. For instance, planner application 414 may display a plurality of tasks, including first task 430, second task 432, and third task 434. As illustrated for first task 430, the task may be associated with text 452 that specifies a subject of the task, a start date and deadline date, a completion status, a priority indication, an alert setting, a reminder selection, and the like. Additionally, first task 430 is associated with a comment field 454 and an urgency flag 456.

FIG. 4B depicts an example of a first user motion received on a dual-screen device in accordance with aspects of the present disclosure.

FIG. 4B illustrates a dual-screen device 400 including a first screen 402 having a first display area 404 and a second screen 406 having a second display area 408. As noted above, first display area 404 and second display area 408 may be configured to receive user input and/or selections via contact with the first screen 402 and the second screen 406, respectively. As illustrated, first display area 404 displays an open application (e.g., mail application 412). Thus, first screen 402 is in an open application state. Second display area 408 also displays an open application (e.g., planner application 414). Thus, second screen 406 is also in an open application state.

As depicted in FIG. 4B, a user 436 may perform a first motion 438 in the reading pane 418 of first display area 404 including or otherwise in close proximity to document icon 428. In aspects, the document icon 428 represents a document attached to mail message 420B. First motion 438 may be a touch, a tap, a double tap, or a press motion, but preferably may be a long press motion. That is, the first motion 438 may be received at a touch interface of the first screen 402 and converted into a communication; the communication may then be provided to the operating system of the dual-screen device 400. A first contact position associated with the first motion 438 may coincide with an initial display location 440 of the document icon 428. As illustrated, initial display location 440 is represented by a dashed rectangle surrounding document icon 428.

When the first contact position of the first motion 438 is at or in close proximity to the initial display location 440 of the document icon 428, a determination may be made by the operating system that the first motion 438 signals an intention by user 436 to select the document icon 428. As noted above, an icon representing a document may be an object as defined herein. When the operating system detects an intention by user 436 to select the document icon 428, the operating system may emphasize the document icon 428 to indicate that it has been selected. For example, the document icon 428 may be emphasized by shading, highlighting, bold outline, or the like.

Figure 4C:
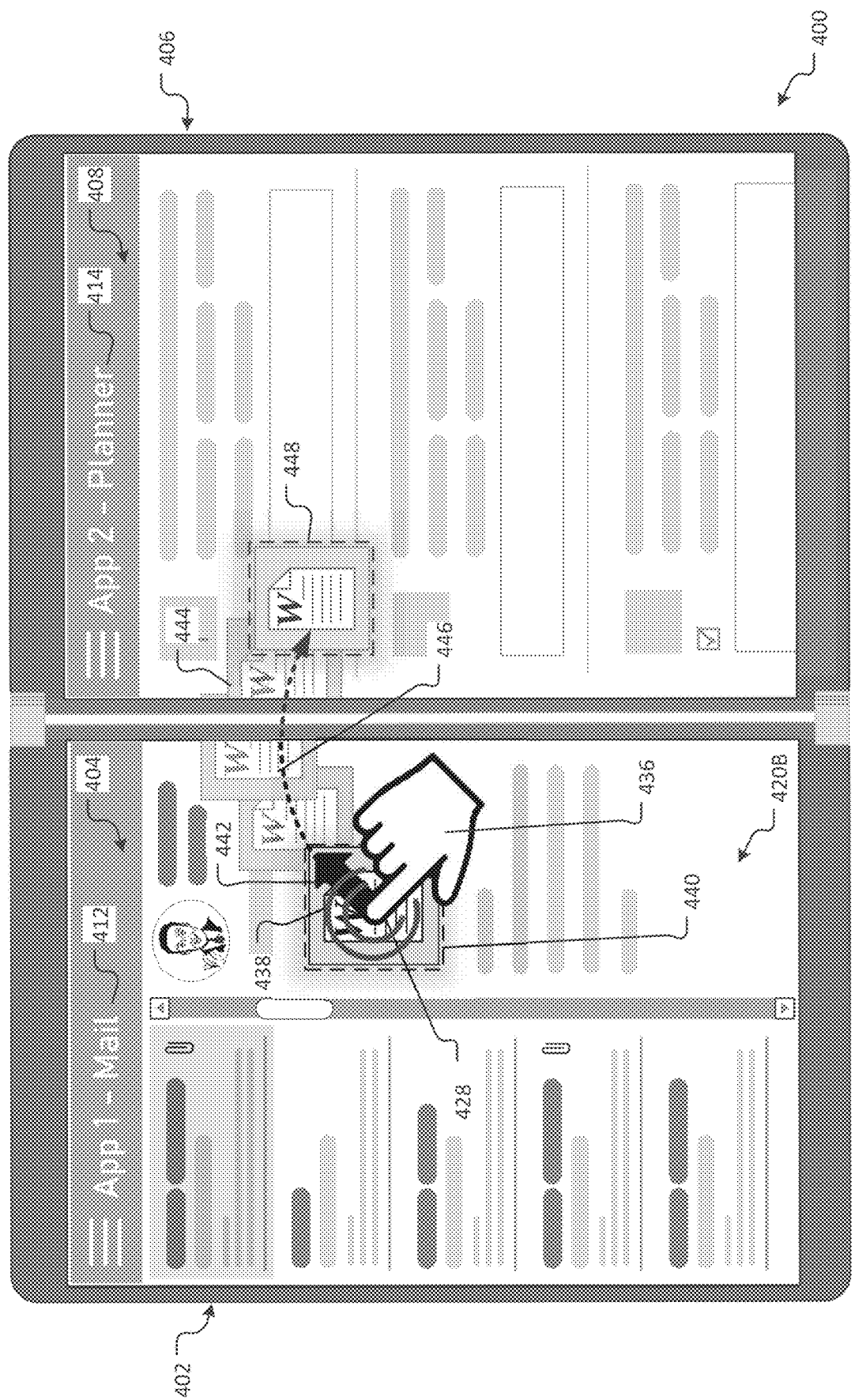

FIG. 4C depicts an example of a second user motion received on a dual-screen device in accordance with aspects of the present disclosure.

FIG. 4C illustrates a dual-screen device 400 including a first screen 402 having a first display area 404 and a second screen 406 having a second display area 308. As noted above, first display area 404 and second display area 408 may be configured to receive user input and/or selections via contact with the first screen 402 and the second screen 406, respectively. As illustrated, first display area 404 displays an open application (e.g., mail application 412). Thus, first screen 402 is in an open application state. Second display area 408 also displays an open application (e.g., planner application 414). Thus, second screen 406 is also in an open application state.

As depicted in FIG. 4C, a user 436 may perform a second motion 442 following or in conjunction with the first motion 438 (collectively, a "throw gesture" as described herein). The second motion 442 may be received in the first display area 404 including or otherwise in close proximity to the document icon 428. Second motion 442 may be a quick sideways motion (e.g., throw motion) while maintaining contact with first screen 402. The quick sideways motion (e.g., throw motion) of second motion 442 on the first screen 402 may be at an upward angle in a direction of second screen 406. The second motion 442 may be received at a touch interface of the first screen 402 and converted into a communication; the communication may then be provided to the operating system of the dual-screen device 400. A second contact position associated with the second motion 442 may initially coincide with an initial display location 440 of the document icon 428. As illustrated, initial display location 440 is represented by a dashed rectangle surrounding document icon 428.

When the first screen 402 receives second motion 442 following first motion 438, the operating system may recognize the throw gesture and initiate an animation 444 of the document icon 428 so as to move the document icon 428 from the initial display location 440 along a trajectory 446 to a final display location 448 in second display area 408. The trajectory 446 may be arched at an upward angle and in a direction substantially coinciding with the upward angle and direction of the second motion 442. In aspects, when the second motion 442 follows the first motion 438 within a threshold time period, a determination may be made by the operating system that a throw gesture has been received. Furthermore, the operating system may determine that the throw gesture signals an intention by user 436 to perform an action on the document icon 428. As noted above, an icon representing a document may be an object. An action is a result of a gesture (e.g., the throw gesture), including operations such as "open," "copy and paste," "attach," and the like.

Figure 4D:
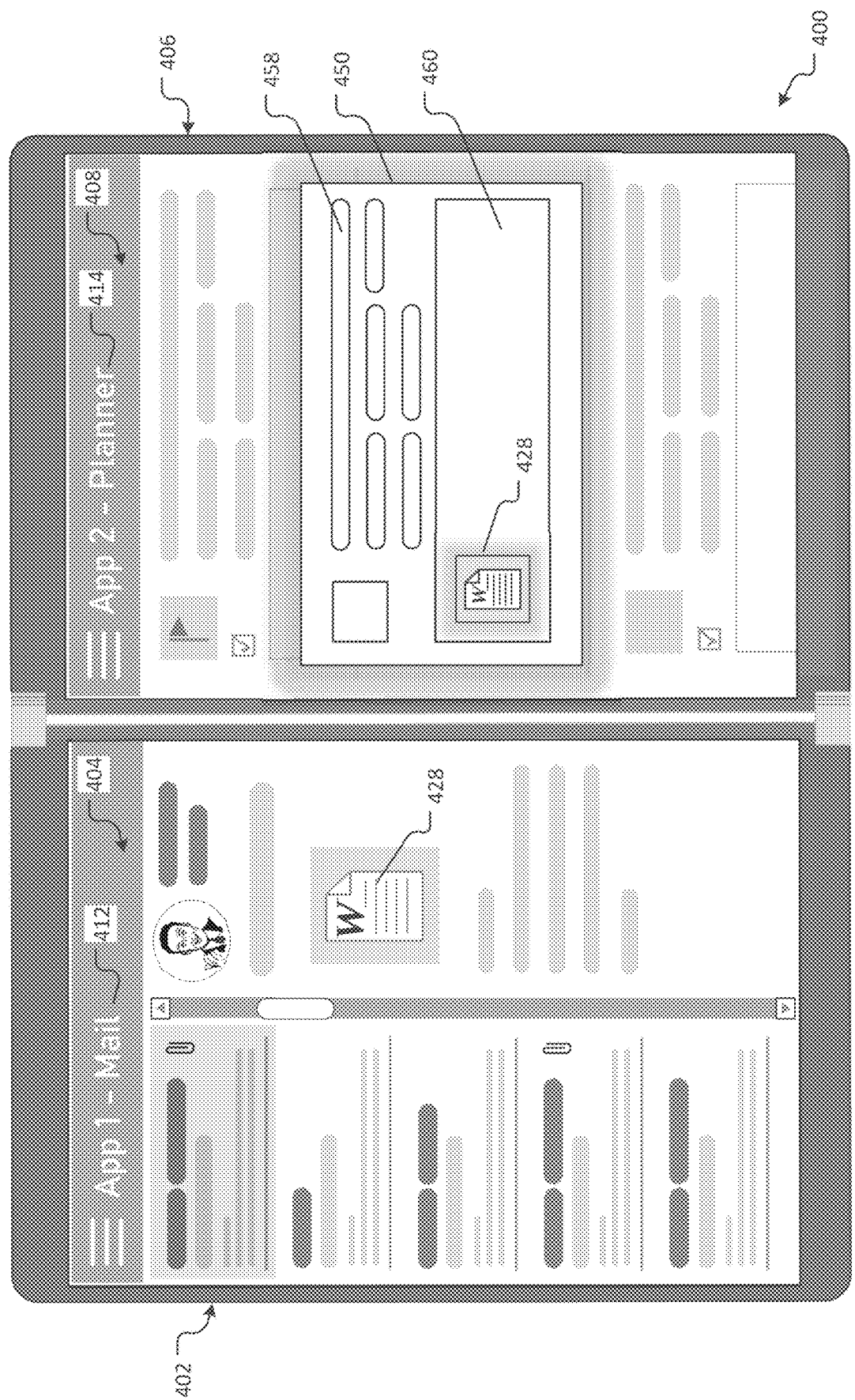

FIG. 4D depicts an example of an action performed on an object on a dual-screen device in accordance with aspects of the present disclosure.

FIG. 4D illustrates a dual-screen device 400 including a first screen 402 having a first display area 404 and a second screen 406 having a second display area 408. As noted above, first display area 404 and second display area 408 may be configured to receive user input and/or selections via contact with the first screen 402 and the second screen 406, respectively. In the illustrated aspect, a new task interface 450 is displayed in second display area 408. As illustrated, new task interface 450 is provided as an overlay over the plurality of existing tasks provided by planner application 414. The new task interface 450 includes a number of blank fields 458, e.g., for specifying a subject of the task, a start date and deadline date, a completion status, a priority indication, an alert setting, a reminder selection, and the like. Additionally, new task interface includes the document icon 428 within a comment field 460. Thus, as illustrated by FIG. 4D, the action performed on the document icon 428 in response to detecting the throw gesture was to automatically generate a new task interface 450 in the second screen 406, including document icon 428 as an attachment.

In another aspect (not shown), the action performed on the document icon 428 may be to automatically attach the document icon 428 to an existing task (e.g., first task 430) in a comment field (e.g., comment field 454). In yet another aspect, the planning application 414 may be replaced by a calendar application. In this case, the action performed on the document icon 428 may be to automatically create a new appointment interface including the document icon 428 in the second display area 408. Alternatively, the action performed on the document icon 428 may be to automatically attach the document icon 428 to an existing appointment of the calendar application.

As should be appreciated, the various methods, devices, interfaces, components, etc., described with respect to FIGS. 4A-4D are not intended to limit the systems and methods to the particular components described. Accordingly, additional topology configurations may be used to practice the methods and systems herein and/or some components described may be excluded without departing from the methods and systems disclosed herein.

Figure 5A:
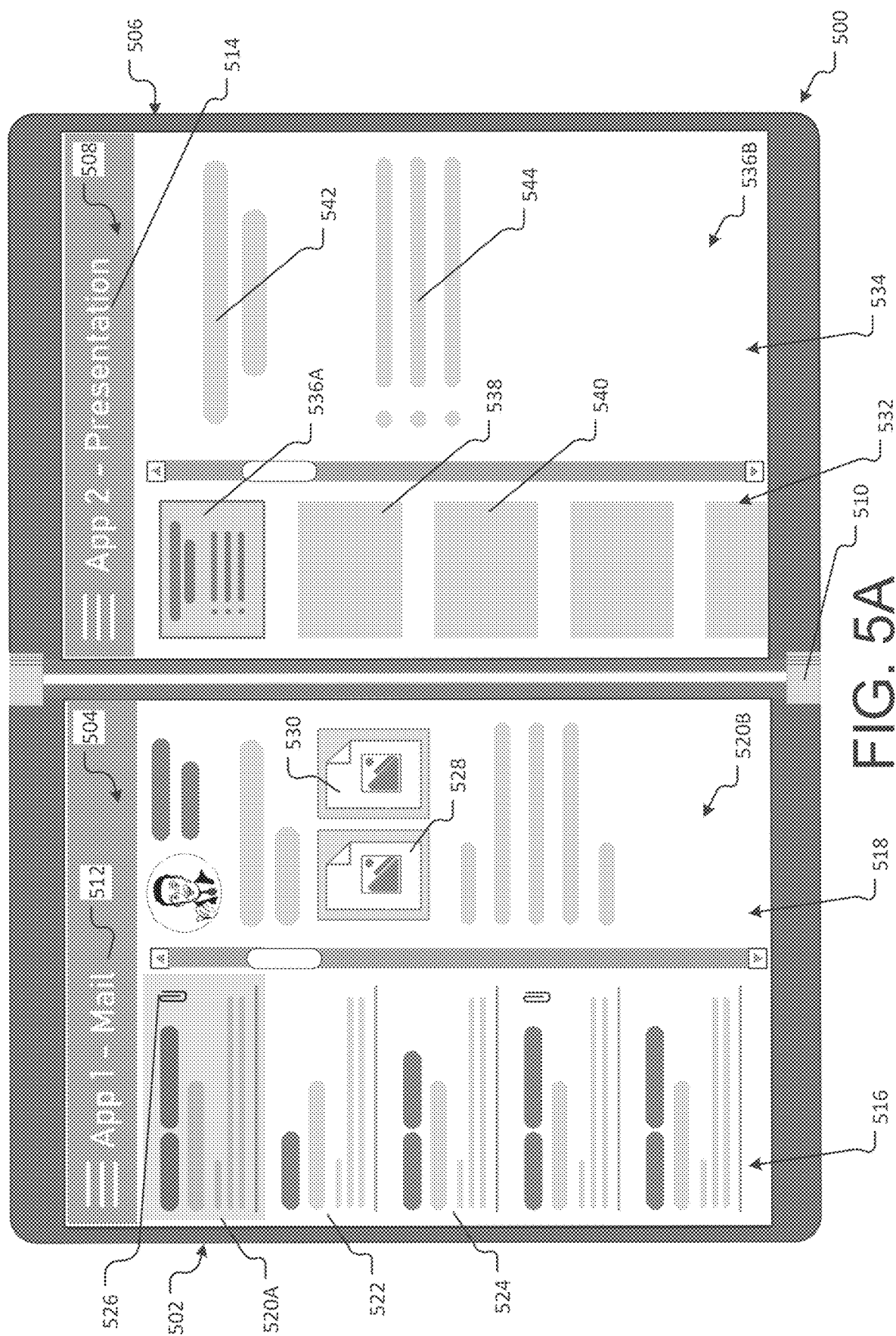
FIGS. 5A-5D depict a fourth example of a gesture and action on a dual-screen device in accordance with examples of the present disclosure.

FIGS. 5A-5D depict a fourth example of a gesture and action on a dual-screen device in accordance with examples of the present disclosure. FIG. 5A depicts a fourth example of a dual-screen device in accordance with examples of the present disclosure.

Dual-screen device 500 is one embodiment of a multi-screen device (e.g., multi-screen device 106). As illustrated, dual-screen device 500 is a portable computing device including two screens communicatively coupled by an electronic connector 510 (e.g., a hinge, a magnetic joint, a malleable material, a wire, and the like). As further illustrated, dual-screen device 500 includes a first screen 502 having a first display area 504 and a second screen 506 having a second display area 508. Dual-screen device 500 illustrates first screen 502 and second screen 506 in a left-to-right orientation. As should be appreciated, the orientation of the first screen relative to the second screen is based on which screen receives a gesture from the user. As the first screen receives the user gesture, the various dual-screen or multi-screen devices described herein are illustrated based on a corresponding orientation.

In aspects, first display area 504 and second display area 508 may be touch enabled. That is, first display area 504 and second display area 508 may be configured to receive user input and/or selections via contact with the first screen 502 and the second screen 506, respectively. As illustrated, first display area 504 displays an open application (e.g., mail application 512). Thus, first screen 502 is in an open application state. Second display area 508 also displays an open application (e.g., presentation application 514). Thus, second screen 506 is also in an open application state.

The mail application 512 displayed in first display area 504 provides mail messages to a user in a dual-pane interface, including a list pane 516 and a reading pane 518. List pane 516 displays truncated views of a plurality of mail messages, including a least a first mail message 520A, a second mail message 522, and a third mail message 524. First mail message 520A includes an attachment icon 526 representing an attachment to the first mail message 520A. Additionally, first mail message 520A is illustrated as selected in the list pane 516 (indicated by shading). Reading pane 518 displays an expanded view of first mail message 520B, which was selected in list pane 516. First mail message 520B is displayed with a first image icon 528 representing a first image and a second image icon 530 representing a second image attached to first mail message 520B.

The presentation application 514 displayed in second display area 508 provides slides for a presentation in a dual-pane interface, including a slide list pane 532 and a current slide pane 534. Slide list pane 532 displays minimized views of a plurality of slides, including a least a first slide 536A, a second slide 538, and a third slide 540. First slide 536A is illustrated as selected in the slide list pane 532 (indicated by shading). Current slide pane 534 displays an expanded view of first slide 536B (e.g., the current slide), which was selected in slide list pane 532. First slide 536B is displayed with a title 542 and bulleted text 544.

Figure 5B:
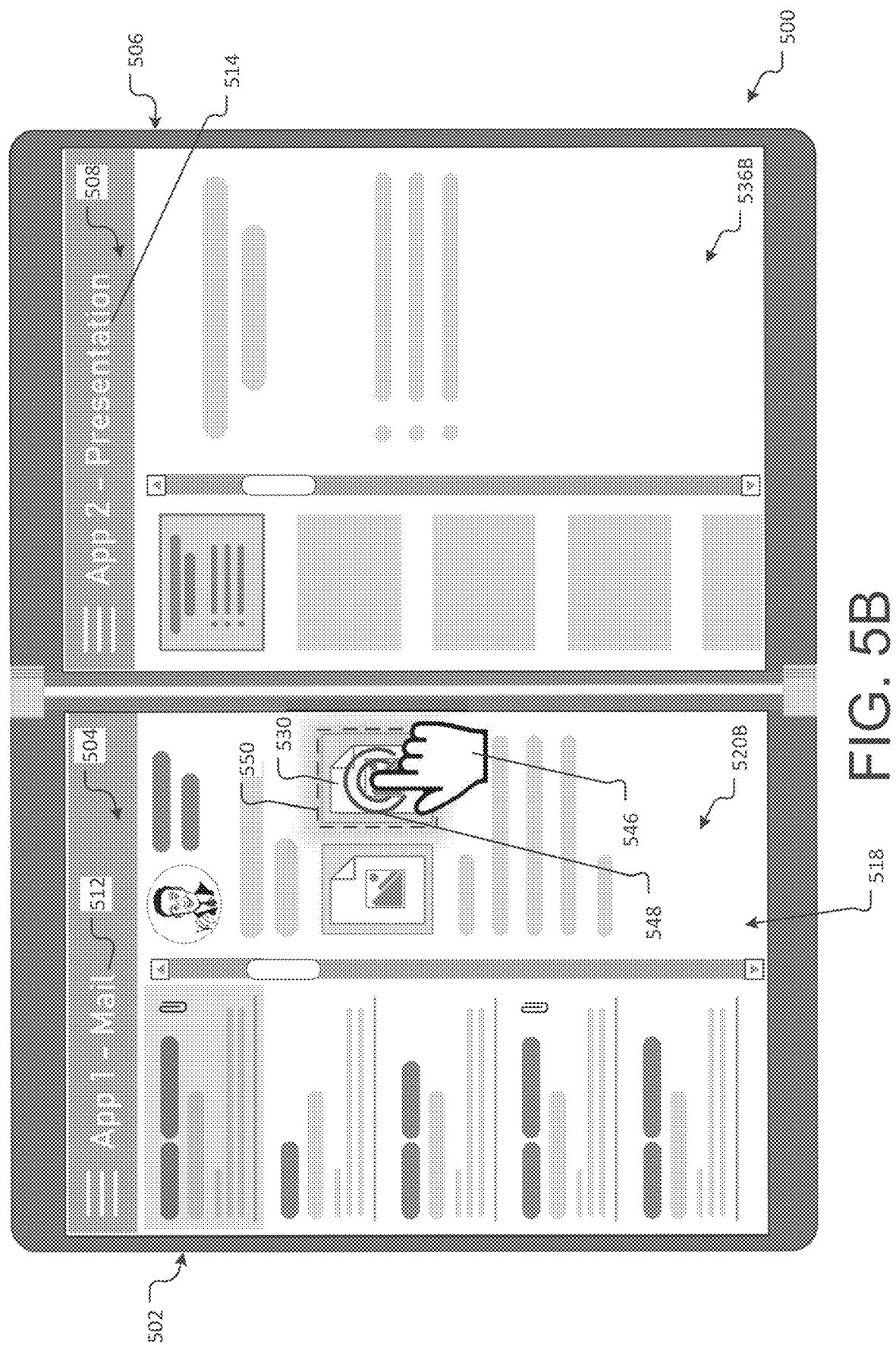

FIG. 5B depicts an example of a first user motion received on a dual-screen device in accordance with aspects of the present disclosure.

FIG. 5B illustrates a dual-screen device 500 including a first screen 502 having a first display area 504 and a second screen 506 having a second display area 508. As noted above, first display area 504 and second display area 508 may be configured to receive user input and/or selections via contact with the first screen 502 and the second screen 506, respectively. As illustrated, first display area 504 displays an open application (e.g., mail application 512). Thus, first screen 502 is in an open application state. Second display area 508 also displays an open application (e.g., presentation application 514). Thus, second screen 506 is also in an open application state.

As depicted in FIG. 5B, a user 546 may perform a first motion 548 in the reading pane 518 of first display area 504 including or otherwise in close proximity to second image icon 530. In aspects, the second image icon 530 represents a second image attached to mail message 520B. First motion 548 may be a touch, a tap, a double tap, or a press motion, but preferably may be a long press motion. That is, the first motion 548 may be received at a touch interface of the first screen 502 and converted into a communication; the communication may then be provided to the operating system of the dual-screen device 500. A first contact position associated with the first motion 548 may coincide with an initial display location 550 of the second image icon 530. As illustrated, initial display location 550 is represented by a dashed rectangle surrounding second image icon 530.

When the first contact position of the first motion 548 is at or in close proximity to the initial display location 550 of the second image icon 530, a determination may be made by the operating system that the first motion 548 signals an intention by user 546 to select the second image icon 530. As noted above, an icon representing content (e.g., an image) may be an object as defined herein. When the operating system detects an intention by user 546 to select the second image icon 530, the operating system may emphasize the second image icon 530 to indicate that it has been selected. For example, the second image icon 530 may be emphasized by shading, highlighting, bold outline, or the like.

Figure 5C:
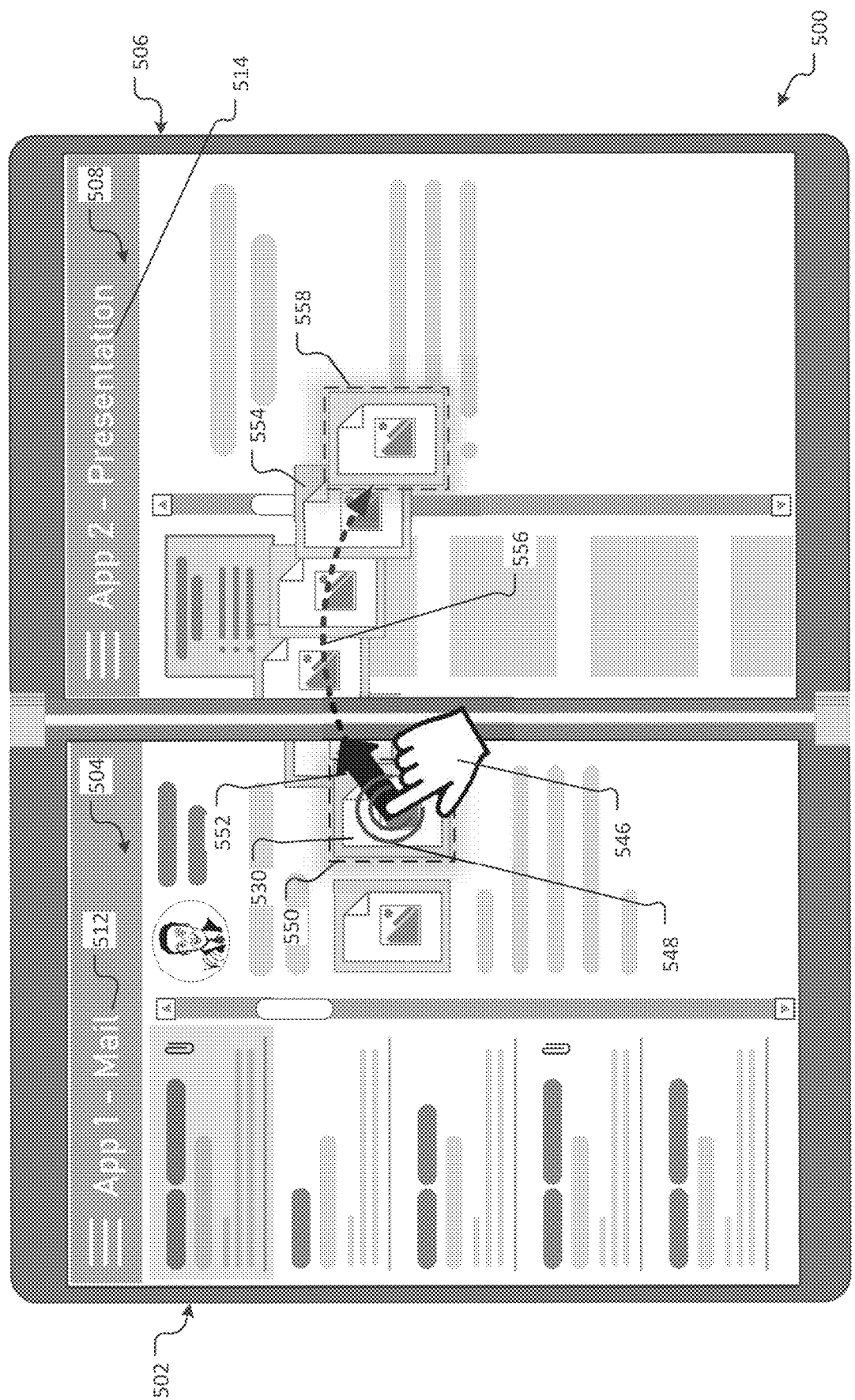

FIG. 5C depicts an example of a second user motion received on a dual-screen device in accordance with aspects of the present disclosure.

FIG. 5C illustrates a dual-screen device 500 including a first screen 502 having a first display area 504 and a second screen 506 having a second display area 508. As noted above, first display area 504 and second display area 508 may be configured to receive user input and/or selections via contact with the first screen 502 and the second screen 506, respectively. As illustrated, first display area 504 displays an open application (e.g., mail application 512). Thus, first screen 502 is in an open application state. Second display area 508 also displays an open application (e.g., presentation application 514). Thus, second screen 506 is also in an open application state.

As depicted in FIG. 5C, a user 546 may perform a second motion 552 following or in conjunction with the first motion 548 (collectively, a "throw gesture" as described herein). The second motion 552 may be received in the first display area 504 including or otherwise in close proximity to the second image icon 530. Second motion 552 may be a quick sideways motion (e.g., throw motion) while maintaining contact with first screen 502. The quick sideways motion (e.g., throw motion) of second motion 552 on the first screen 502 may be at an upward angle in a direction of second screen 506. The second motion 552 may be received at a touch interface of the first screen 502 and converted into a communication; the communication may then be provided to the operating system of the dual-screen device 500. A second contact position associated with the second motion 552 may initially coincide with an initial display location 550 of the second image icon 530. As illustrated, initial display location 550 is represented by a dashed rectangle surrounding second image icon 530.

When the first screen 502 receives second motion 552 following first motion 548, the operating system may recognize the throw gesture and initiate an animation 554 of the second image icon 530 so as to move the second image icon 530 from the initial display location 550 along a trajectory 556 to a final display location 558 in second display area 508. The trajectory 556 may be arched at an upward angle and in a direction substantially coinciding with the upward angle and direction of the second motion 552. In aspects, when the second motion 552 follows the first motion 548 within a threshold time period, a determination may be made by the operating system that a throw gesture has been received. Furthermore, the operating system may determine that the throw gesture signals an intention by user 546 to perform an action on the second image icon 530. As noted above, an icon representing content (e.g., an image) may be an object. An action is a result of a gesture (e.g., the throw gesture), including operations such as "open," "copy and paste," "attach," and the like.

Figure 5D:
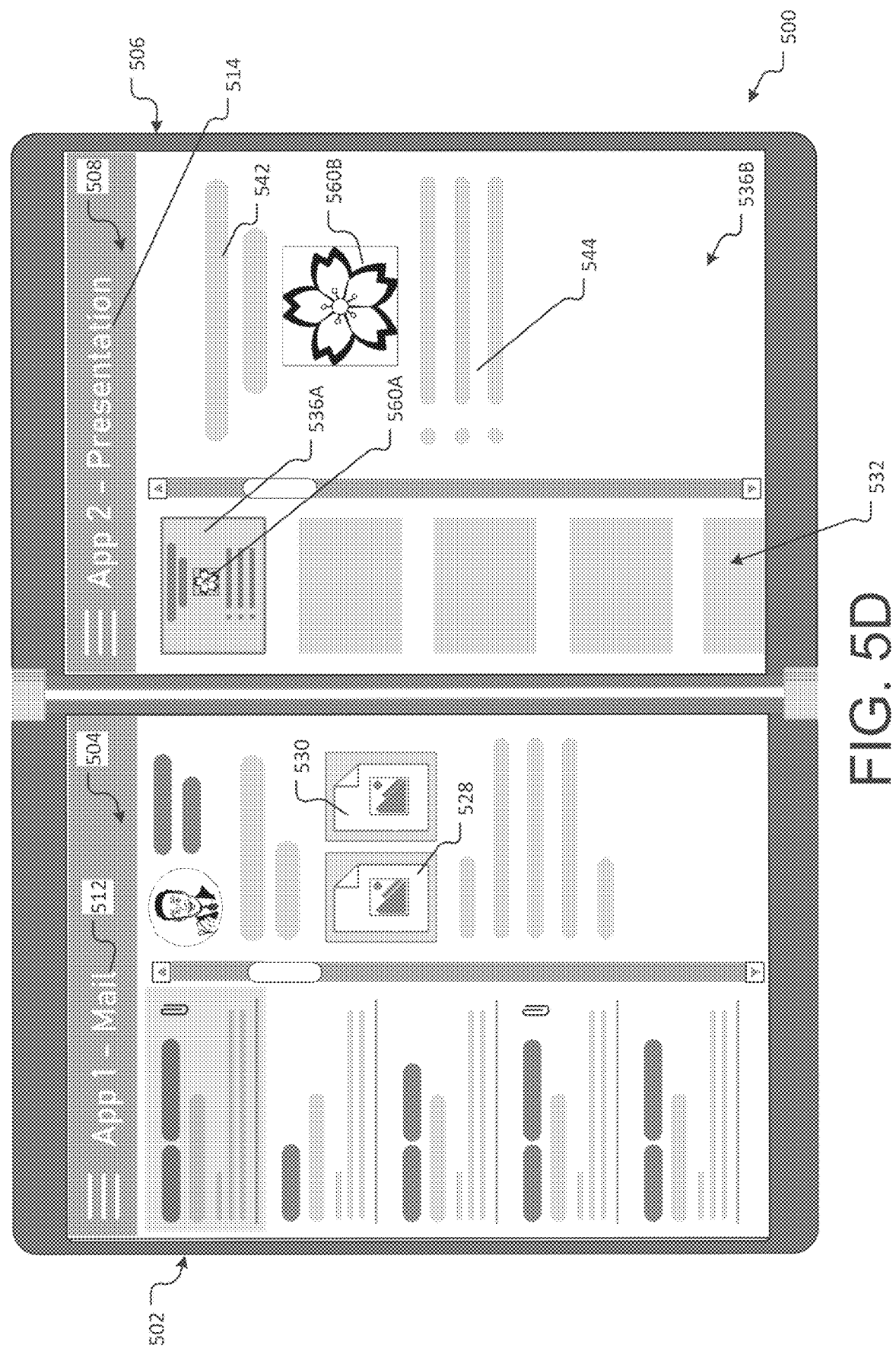

FIG. 5D depicts an example of an action performed on an object on a dual-screen device in accordance with aspects of the present disclosure.

FIG. 5D illustrates a dual-screen device 500 including a first screen 502 having a first display area 504 and a second screen 506 having a second display area 508. As noted above, first display area 504 and second display area 508 may be configured to receive user input and/or selections via contact with the first screen 502 and the second screen 506, respectively. In the illustrated aspect, a second image 560B corresponding to the second image icon 530 has been inserted into first slide 536B of the presentation application 514 in the second display area 508. As illustrated, second image 560B has been inserted between title 542 and bulleted text 544 of first slide 536B. Additionally, a minimized view of the second image 560A is displayed in first slide 536A in the slide list pane 532. Thus, as illustrated by FIG. 5D, the action performed on the second image icon 530 in response to detecting the throw gesture was to automatically insert (e.g., copy/paste) a second image 560B corresponding to the second image icon 530 into a current slide (e.g., first slide 536B) of presentation application 514 in second display area 508.

As should be appreciated, the various methods, devices, interfaces, components, etc., described with respect to FIGS. 5A-5D are not intended to limit the systems and methods to the particular components described. Accordingly, additional topology configurations may be used to practice the methods and systems herein and/or some components described may be excluded without departing from the methods and systems disclosed herein.

Figure 6A:
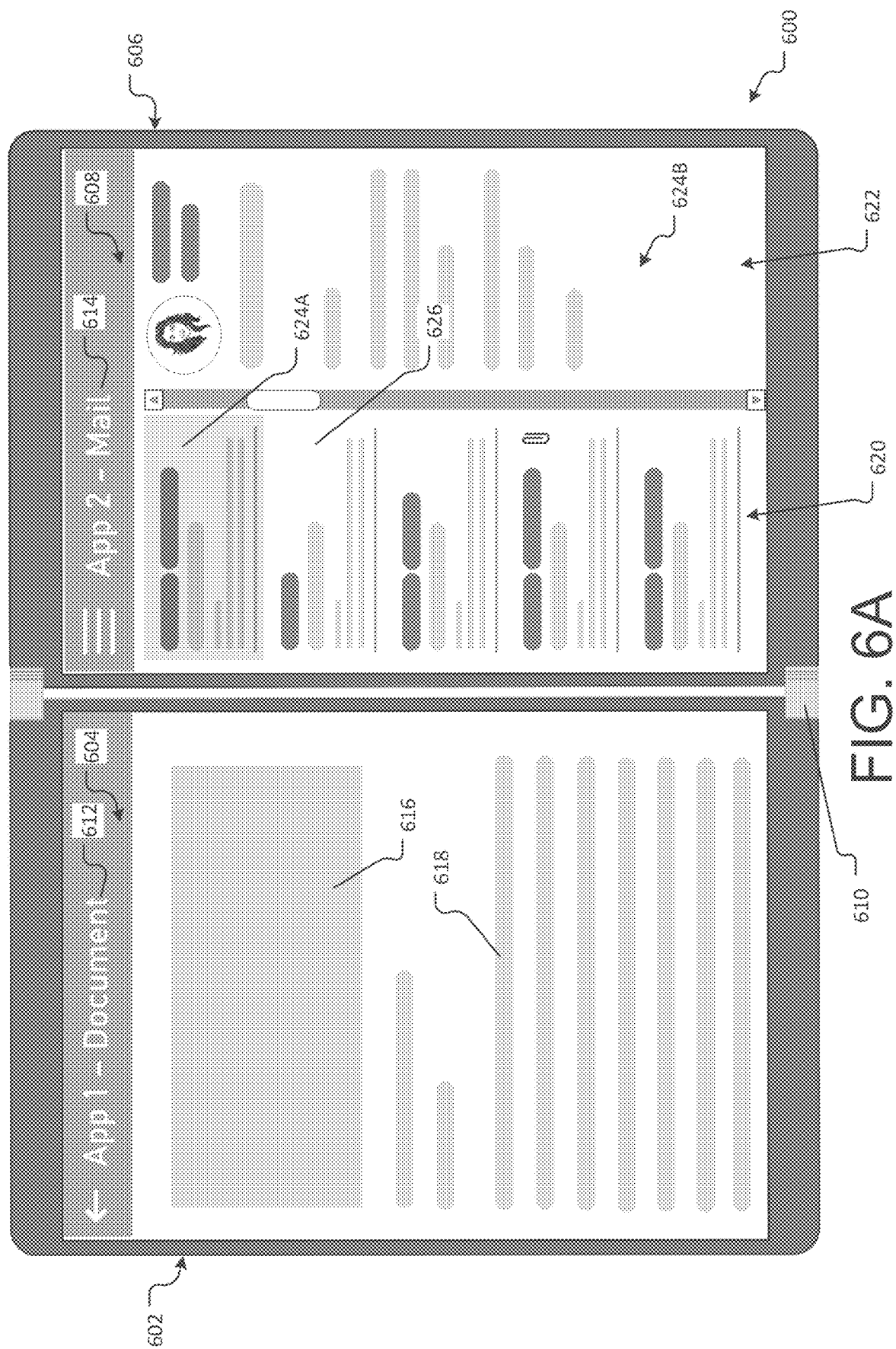
FIGS. 6A-6D depict a fifth example of a gesture and action on a dual-screen device in accordance with examples of the present disclosure.

FIGS. 6A-6D depict a fifth example of a gesture and action on a dual-screen device in accordance with examples of the present disclosure. FIG. 6A depicts a fifth example of a dual-screen device in accordance with examples of the present disclosure.

Dual-screen device 600 is one embodiment of a multi-screen device (e.g., multi-screen device 106). As illustrated, dual-screen device 600 is a portable computing device including two screens communicatively coupled by an electronic connector 610 (e.g., a hinge, a magnetic joint, a malleable material, a wire, and the like). As further illustrated, dual-screen device 600 includes a first screen 602 having a first display area 604 and a second screen 606 having a second display area 608. Dual-screen device 600 illustrates first screen 602 and second screen 606 in a left-to-right orientation. As should be appreciated, the orientation of the first screen relative to the second screen is based on which screen receives a gesture from the user. As the first screen receives the user gesture, the various dual-screen or multi-screen devices described herein are illustrated based on a corresponding orientation.

In aspects, first display area 604 and second display area 608 may be touch enabled. That is, first display area 604 and second display area 608 may be configured to receive user input and/or selections via contact with the first screen 602 and the second screen 606, respectively. As illustrated, first display area 604 displays an open application (e.g., document 612). Thus, first screen 602 is in an open application state. Second display area 608 also displays an open application (e.g., mail application 614). Thus, second screen 606 is also in an open application state.

FIG. 6A shows an open application (e.g., document 612) in first display area 604 of first screen 602. As noted above, a document is "open" when it has been launched and is available for user interaction within the first display area 604 of first screen 602 of dual-screen device 600. As illustrated, document 612 includes content, such as image 616 and/or text 618.

The mail application 614 displayed in second display area 608 provides mail messages to a user in a dual-pane interface, including a list pane 620 and a reading pane 622 within second display area 608. List pane 620 displays truncated views of a plurality of mail messages, including a least first mail message 624A and second mail message 626. First mail message 624A is illustrated as selected in the list pane 620 (indicated by shading). Reading pane 622 displays an expanded view of first mail message 624B, which was selected in list pane 620.

Figure 6B:
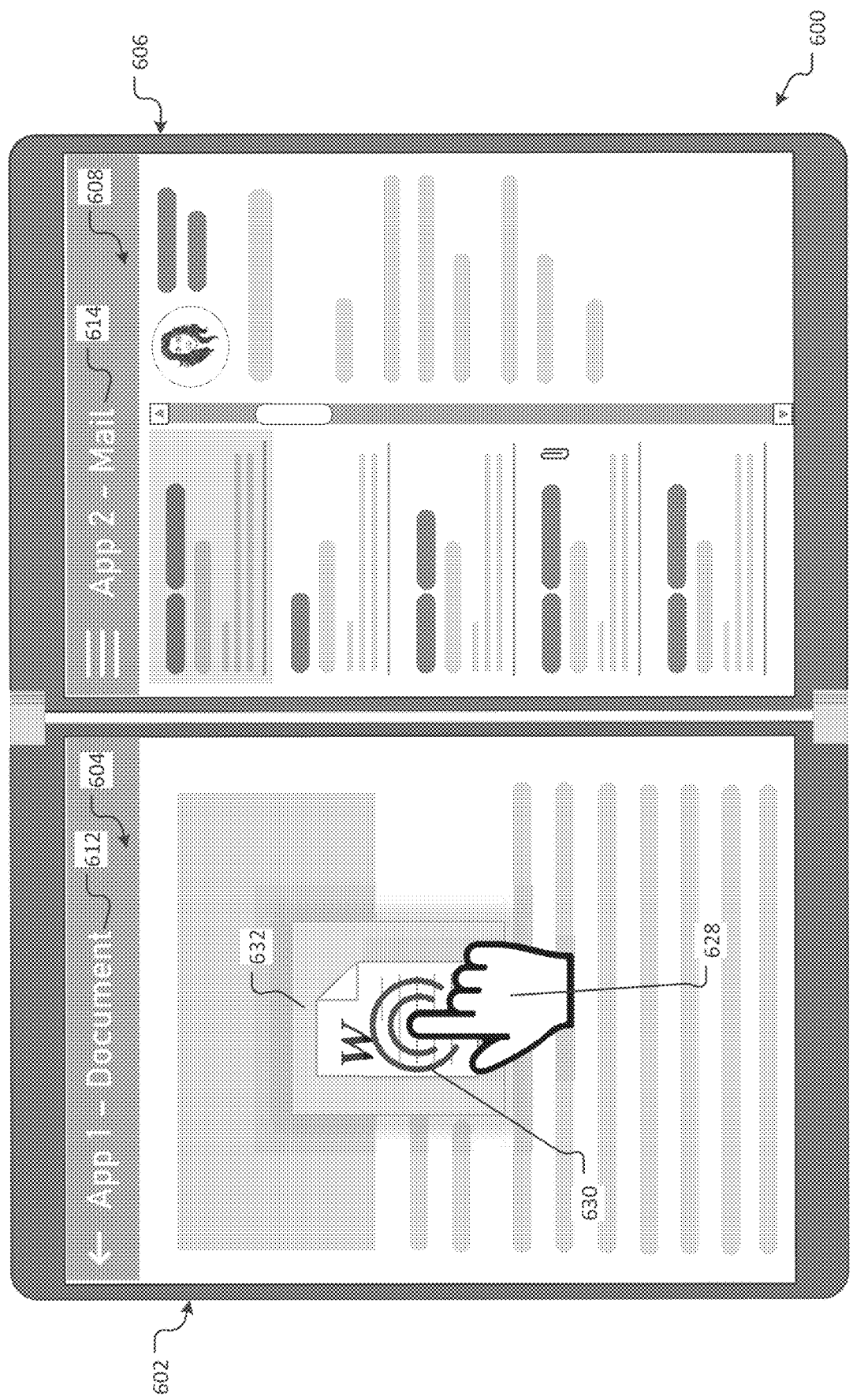

FIG. 6B depicts an example of a first user motion received on a dual-screen device in accordance with aspects of the present disclosure.

FIG. 6B illustrates a dual-screen device 600 including a first screen 602 having a first display area 604 and a second screen 606 having a second display area 608. As noted above, first display area 604 and second display area 608 may be configured to receive user input and/or selections via contact with the first screen 602 and the second screen 606, respectively. As illustrated, first display area 604 displays an open application (e.g., document 612). Thus, first screen 602 is in an open application state. Second display area 608 also displays an open application (e.g., mail application 614). Thus, second screen 606 is also in an open application state.

As depicted in FIG. 6B, a user 628 may perform a first motion 630 on document 612 in the first display area 604. First motion 630 may be a touch, a tap, a double tap, or a press motion, but preferably may be a long press motion. That is, the first motion 630 may be received at a touch interface of the first screen 602 and converted into a communication; the communication may then be provided to the operating system of the dual-screen device 600. A first contact position associated with the first motion 630 may coincide with a display location of at least some content of the document 612.

When the first contact position of the first motion 628 coincides with the display location of at least some content of the document 612, a determination may be made by the operating system that the first motion 630 signals an intention by user 628 to select the document 612. When the operating system detects an intention by user 628 to select document 612, the operating system may generate a document icon 632 representing document 612. As illustrated, document icon 632 may be emphasized to indicate that the document 612 has been selected. For example, the document icon 632 may be emphasized by shading, highlighting, bold outline, or the like.

Figure 6C:
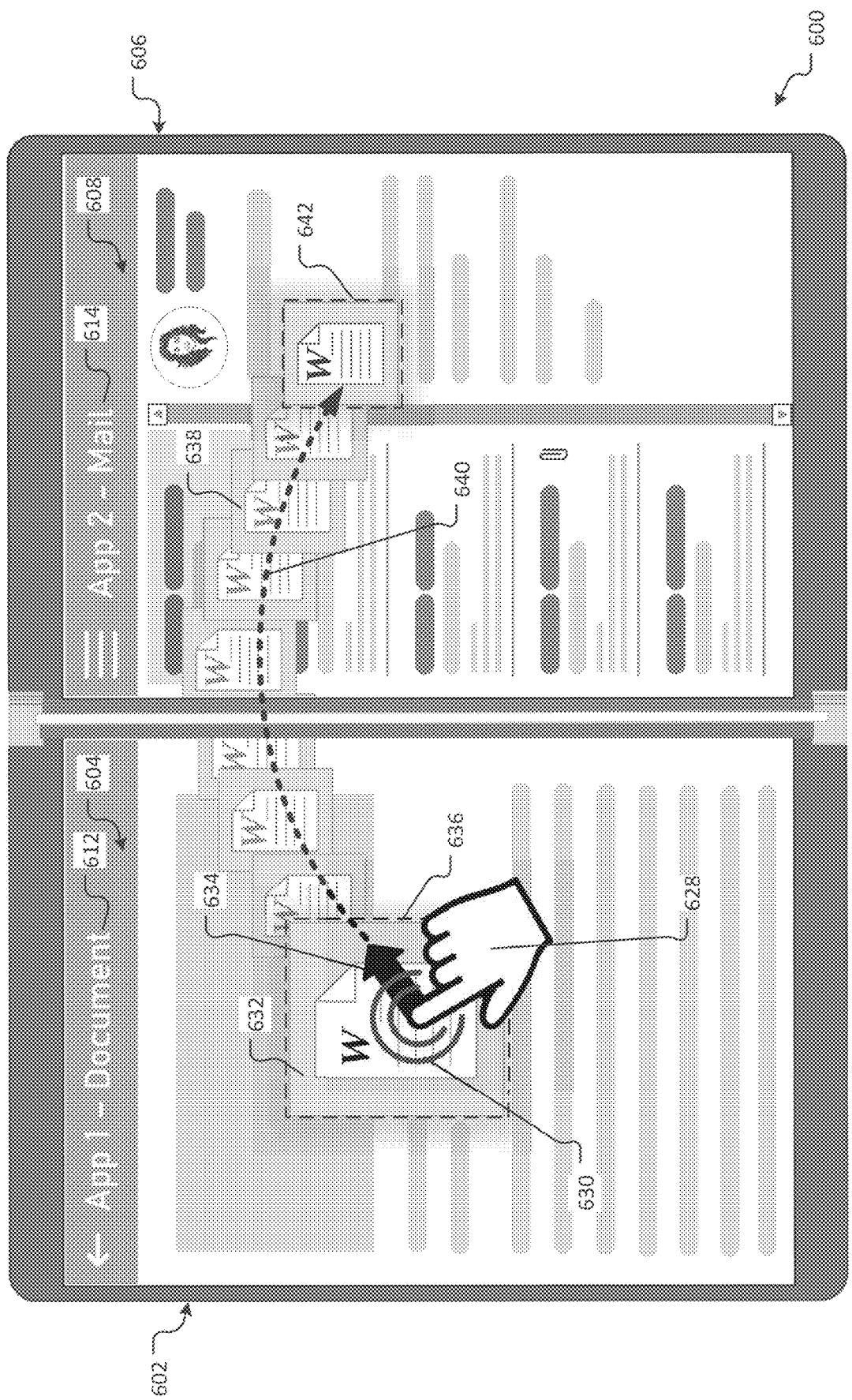

FIG. 6C depicts an example of a second user motion received on a dual-screen device in accordance with aspects of the present disclosure.

FIG. 6C illustrates a dual-screen device 600 including a first screen 602 having a first display area 604 and a second screen 606 having a second display area 608. As noted above, first display area 604 and second display area 608 may be configured to receive user input and/or selections via contact with the first screen 602 and the second screen 606, respectively. As illustrated, first display area 604 displays an open application (e.g., document 612). Thus, first screen 602 is in an open application state. Second display area 608 also displays an open application (e.g., mail application 614). Thus, second screen 606 is also in an open application state.

As depicted in FIG. 6C, a user 628 may perform a second motion 634 following or in conjunction with the first motion 630 (collectively, a "throw gesture" as described herein). The second motion 634 may be received in the first display area 604 including or otherwise in close proximity to the document icon 632. Second motion 634 may be a quick sideways motion (e.g., throw motion) while maintaining contact with first screen 602. The quick sideways motion (e.g., throw motion) of second motion 634 on the first screen 602 may be at an upward angle in a direction of second screen 606. The second motion 634 may be received at a touch interface of the first screen 602 and converted into a communication; the communication may then be provided to the operating system of the dual-screen device 600. A second contact position associated with the second motion 634 may initially coincide with an initial display location 636 of the document icon 632. As illustrated, initial display location 636 is represented by a dashed rectangle surrounding document icon 632.

When the first screen 602 receives second motion 634 following first motion 630, the operating system may recognize the throw gesture and initiate an animation 638 of the document icon 632 so as to move the document icon 632 from the initial display location 636 along a trajectory 640 to a final display location 642 in second display area 608. The trajectory 640 may be arched at an upward angle and in a direction substantially coinciding with the upward angle and direction of the second motion 634. In aspects, when the second motion 634 follows the first motion 630 within a threshold time period, a determination may be made by the operating system that a throw gesture has been received. Furthermore, the operating system may determine that the throw gesture signals an intention by user 628 to perform an action on the document icon 632. As noted above, an icon representing a document may be an object. An action is a result of a gesture (e.g., the throw gesture), including operations such as "open," "copy and paste," "attach," and the like.

Figure 6D:
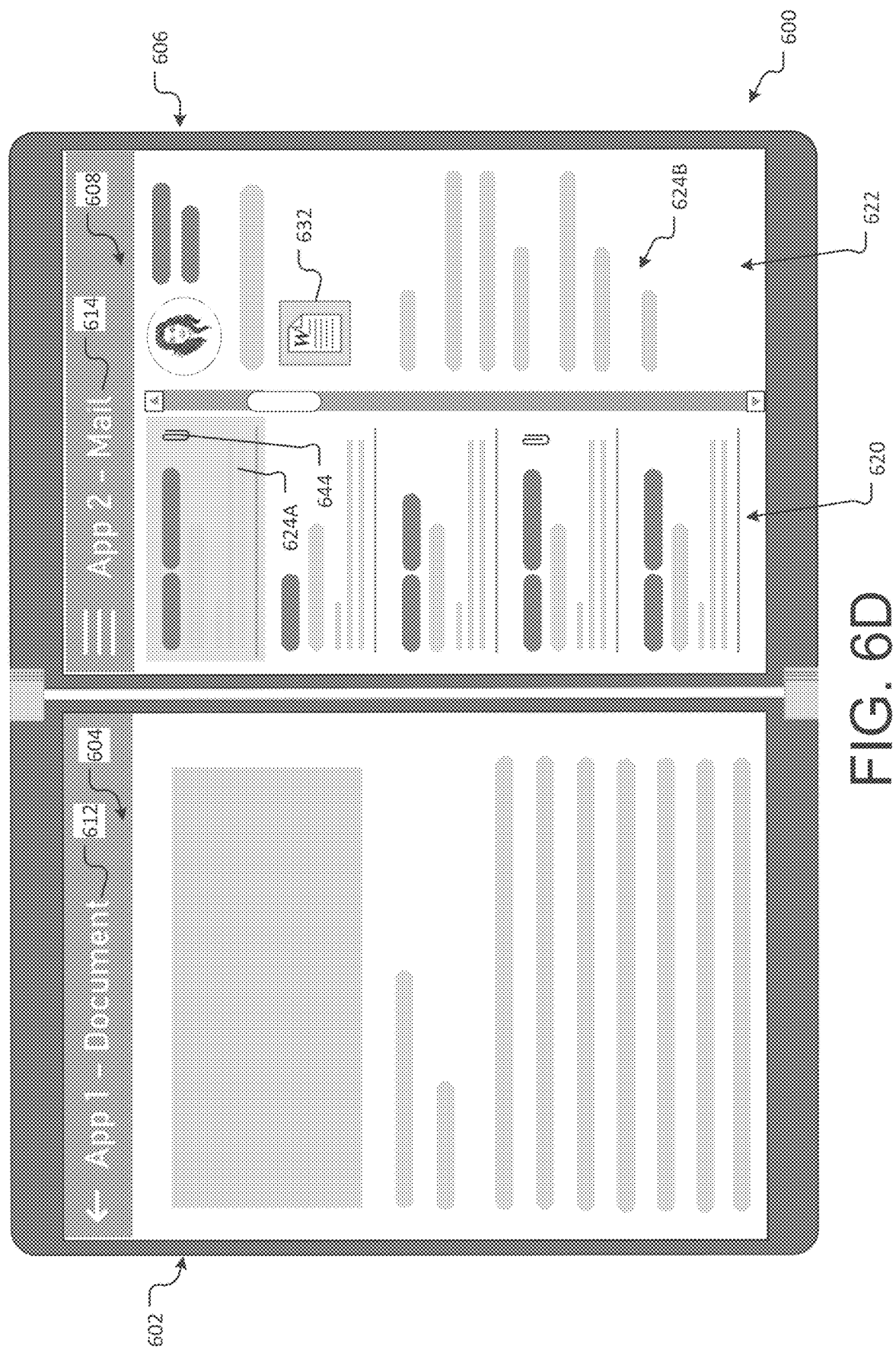

FIG. 6D depicts an example of an action performed on an object on a dual-screen device in accordance with aspects of the present disclosure.

FIG. 6D illustrates a dual-screen device 600 including a first screen 602 having a first display area 604 and a second screen 606 having a second display area 608. As noted above, first display area 604 and second display area 608 may be configured to receive user input and/or selections via contact with the first screen 602 and the second screen 606, respectively. In the illustrated aspect, document icon 632 is now displayed as attached to first mail message 624B in reading pane 622 of second display area 608. Additionally, an attachment icon 644 is associated with first mail message 624A in the list pane 620 of second display area 608. Thus, as illustrated by FIG. 6D, the action performed on the document icon 632 in response to detecting the throw gesture was to automatically attach document 612 to a first mail message 624A/624B in the second screen 606, including displaying document icon 632 as an attachment to the first mail message 624B.

As should be appreciated, the various methods, devices, interfaces, components, etc., described with respect to FIGS. 6A-6D are not intended to limit the systems and methods to the particular components described. Accordingly, additional topology configurations may be used to practice the methods and systems herein and/or some components described may be excluded without departing from the methods and systems disclosed herein.

Figure 7:
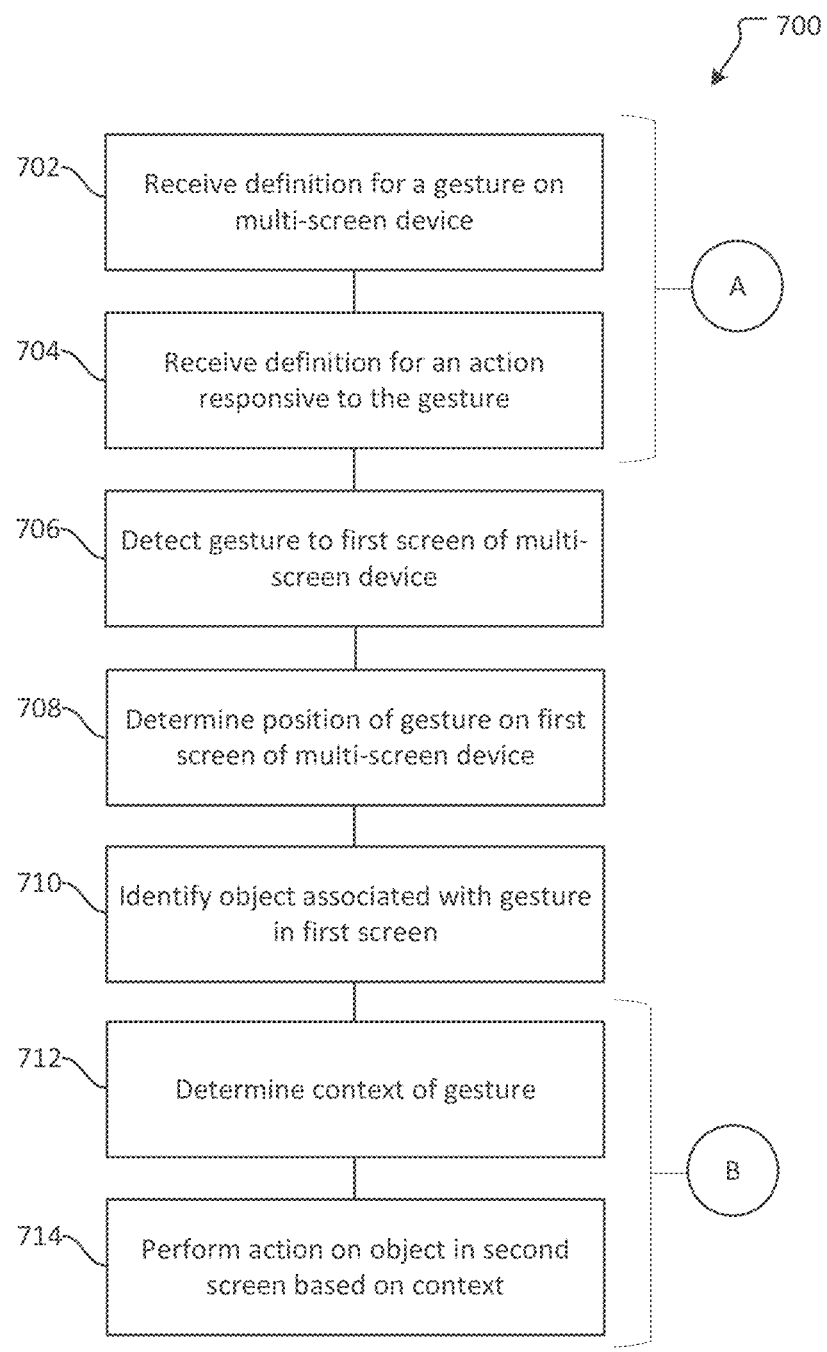
FIG. 7 illustrates an example method of defining a gesture for a multi-screen device in accordance with aspects of the present disclosure.

FIG. 7 illustrates an example method of defining a gesture for a multi-screen device in accordance with aspects of the present disclosure.

A general order of the operations for the method 700 is shown in FIG. 7. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, an FPGA, a SOC or other hardware device. Hereinafter, the method 700 shall be explained with reference to the systems, components, devices, modules, software, data structures, data characteristic representations, signaling diagrams, methods, etc., described in conjunction with FIGS. 1-6D, and 9-11B.

At receive gesture definition operation 702, a definition for a gesture may be received for a multi-screen device. In aspects, a definition for the gesture may be received from a system developer (e.g., system developer 104). For instance, the system developer may encode the gesture at an operating system level of the multi-screen device (e.g., multi-screen device 106). As used herein, a "gesture" may be defined as one or more user motions (or user inputs) signaling a user intention to perform an action based on a context. In some aspects, the gesture may be defined by multiple user motions. For instance, for a touch-enabled device, a user motion may include a long press (e.g., a detected touch for a threshold period of time on the first screen of a multi-screen device), a double tap (e.g., two short detected touches on the first screen of a multi-screen device), a "throw" motion (e.g., a touch in a quick sideways direction on the first screen towards the second screen of a multi-screen device), or a "sideways swipe" motion (e.g., a touch from a point on the first screen to an edge of the first screen adjacent to the second screen), and the like. In some cases, a "throw gesture" may be defined by multiple user motions, e.g., a long press and then a throw motion. In other cases, a "throw gesture" may be defined by a single user motion, e.g., the throw motion.

At receive action definition operation 704, a definition for an action responsive to the gesture may be received for a multi-screen device. For instance, a definition for the action may be received from a system developer and/or an app developer (e.g., via an app SKD). An "action" as used herein may include a result of the gesture, including an operation on an object such as "open," "copy and paste," "attach," and the like. "Objects" as used herein may refer to applications, files, documents, content (e.g., photos, videos, text), messages, and the like; or icons representing applications, files, documents, content (e.g., photos, videos, text), messages, and the like. In aspects, a gesture detected in a first screen of a multi-screen device may cause an action to be performed in a second screen of the multi-screen device. In further aspects, the action performed in the second screen may be based on a context of the multi-screen device.

At detect operation 706, a gesture may be detected on a first screen of a multi-screen device. For example, the first screen of a multi-screen device may receive one or more user motions to detect the gesture. For example, the one or more user motions may be detected by one or more touch sensors (e.g., capacitive or resistive sensors) on a touch-enabled multi-screen device, or may be detected by one or more motion sensors (e.g., rotational sensors or accelerometers) associated with a tilt or movement of a multi-screen device, or may be detected by one or more motion sensor cameras capturing movements of a user. For instance, for a touch-enabled device, a user motion may include a long press (e.g., a detected touch for a threshold period of time on the first screen of a multi-screen device), a double tap (e.g., two short detected touches on the first screen of a multi-screen device), a "throw" motion (e.g., a touch in a quick sideways direction on the first screen towards the second screen of a multi-screen device), or a "sideways swipe" motion (e.g., a touch from a point on the first screen to an edge of the first screen adjacent to the second screen), and the like. In some cases, a "throw gesture" may be defined by multiple user motions, e.g., a long press and then a throw motion. In other cases, a "throw gesture" may be defined by a single user motion, e.g., the throw motion. For devices without touch-enabled screens (or with multiple sensor modes), a gesture may be detected by a motion sensor such as a rotational sensor or an accelerometer (e.g., a short downward movement of the device and then a swift sideways movement of the device in either direction), or may be detected by motion sensor cameras (e.g., a short palm down hand motion and then a swift sideways hand motion in either direction). As should be appreciated, the user motions and/or device movements described above are not intended to be limiting and a gesture may be defined as one or more user motions and/or device movements, or any combination thereof.

At determine position operation 708, a position of the gesture detected on the first screen may be determined. For example, for capacitive touch sensors, when a conductive object such as a user's finger or other tool (e.g., stylus) makes contact with the first screen, there is a change in a local electrostatic field at the position of the touch on the first screen. This change in capacitance acts as a trigger for detecting the touch at the location. For resistive touch sensors, when a user's finger or other tool (e.g., stylus) makes contact with the first screen, conductive layers within the first screen come into contact thereby causing a voltage drop at the point (e.g., x/y coordinates) of the contact. In aspects, the first screen may further be associated with a pixel grid or an x/y coordinate map of a display area on the first screen. The contact position of the gesture detected by the touch sensor (or other sensor) may be mapped to a display location within the pixel grid or coordinate map of the display area on the first screen.

At identify operation 710, an object associated with the gesture may be identified in the first screen. For example, an object may be identified at or in close proximity to a contact position of the gesture. As detailed above, "objects" may include applications, files, documents, content (e.g., text, photos, videos), messages, and the like; or icons representing applications, files, documents, content, messages, and the like. Objects may be displayed in any screen of the multi-screen device 160. Additionally, each object may be associated with a display location within the pixel grid (or coordinate map) of a display area of a screen of the multi-screen device. When the contact position of the gesture substantially matches the display location of an object, the object may be detected at or in close proximity to the gesture.

At determine context operation 712, a context of the gesture may be determined. As used herein, a "context" may refer to a "device context" and/or an "application context." For example, the multi-screen device may comprise at least a first screen in which a gesture is detected and a second screen. The device context refers to the screen states of one or more screens of the multi-screen device. For example, a screen state may refer to a "resting state" or an "open state." In a resting state, there are no open application in the screen; whereas in an open state, an application is open in the screen. In aspects, an application is "open" when the application has been launched and is available for user interaction within a screen of a multi-screen device. In the resting state, while no applications may be open, the screen may comprise system functionalities, such as date/time features, object icons, system icons (e.g., device settings), etc. In addition to determining a device context, an application context of the multi-screen device may be determined. For screens in an open application state, the "application context" refers to the particular application that is open on the screen as well as a state of the open application. For instance, the application context may refer to a type of application, such as a mail application, a document application, a presentation application, a calendar application, a task application, and the like. More specifically, the application context may refer to a particular application of an application type (e.g., Outlook® or Gmail® of a mail application type). Still more specifically, the application context may refer to the state of the particular application (or application type) that is open. An application state may refer to the feature of the application that is being accessed. For instance, for a mail application with an open interface displaying an inbox, the application state may be "inbox state." Alternatively, for a mail application with an open interface displaying sent items, the application state may be "sent state." Further still, for a mail application with an open interface for composing a mail message, the application state may be "compose state." In aspects, an action responsive to a gesture may be defined by an app developer in a software development kit (SDK) for a particular application.

At perform operation 714, an action responsive to the gesture may be performed on the object based on the context. As noted above, a gesture may be received in a first screen of a multi-screen device. An object may be determined to have a display location at or near a contact position of the gesture in the first screen. Based on the context, an action may be performed on the object in a second screen of the multi-screen device. By way of a first example, the first screen and the second screen may be in the resting state. Additionally, the object associated with the gesture in the first screen may be an application icon for a mail application. In this case, the action may be to automatically open the mail application in the second screen. By way of a second example, the first screen may be in an open state with an open mail application and the second screen may be in an open state with an open task application. The identified object may be an attachment associated with a message displayed by the mail application. Based on the context, the action may be to automatically create a new task interface including the attachment in the planner application. As should be appreciated, based on the identified object and the context of the multi-screen device, different actions may be performed in the second screen. In this way, the present application provides a well-defined gesture for a multi-screen device, where responsive actions may be defined by system developers or app developers. Thus, based on the defined gesture and associated actions, users are able to easily and intuitively open applications, share data between applications, and/or attach files within a multi-screen environment.

Figure 8:
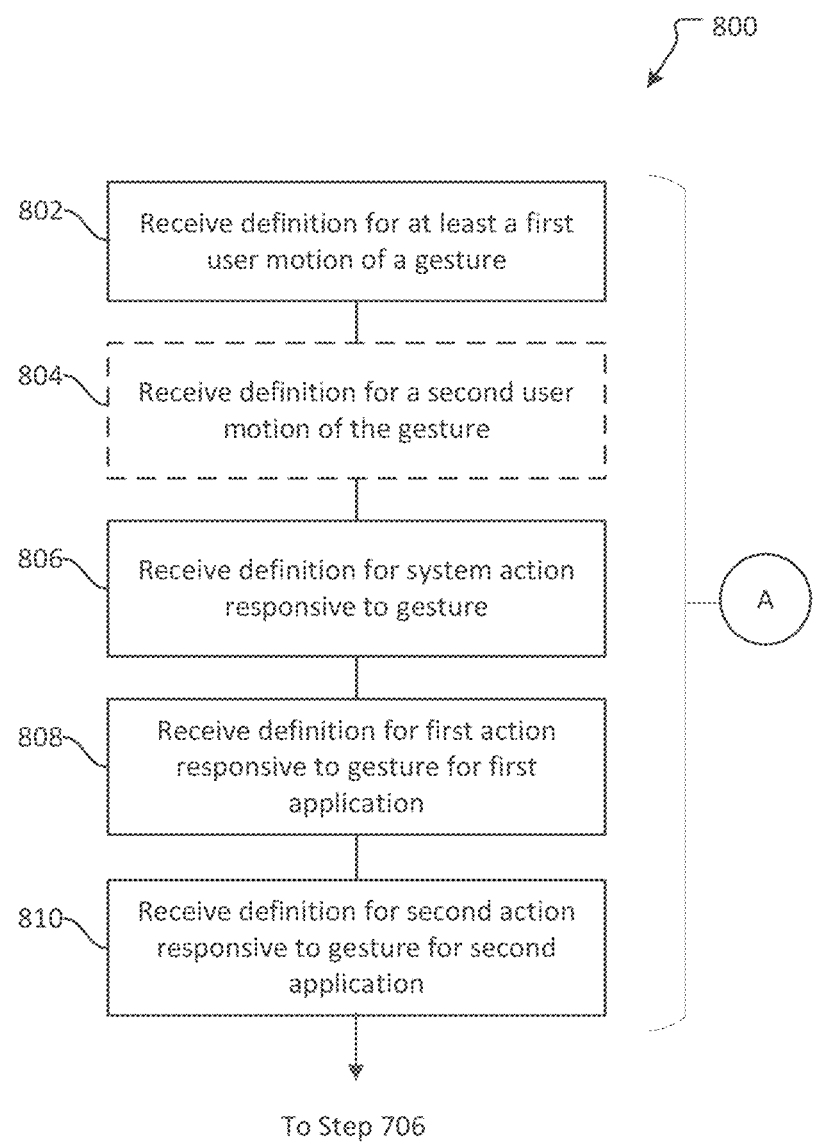
FIG. 8 illustrates an example method of defining a gesture and one or more actions for a multi-screen device in accordance with aspects of the present disclosure.
Figure 9:
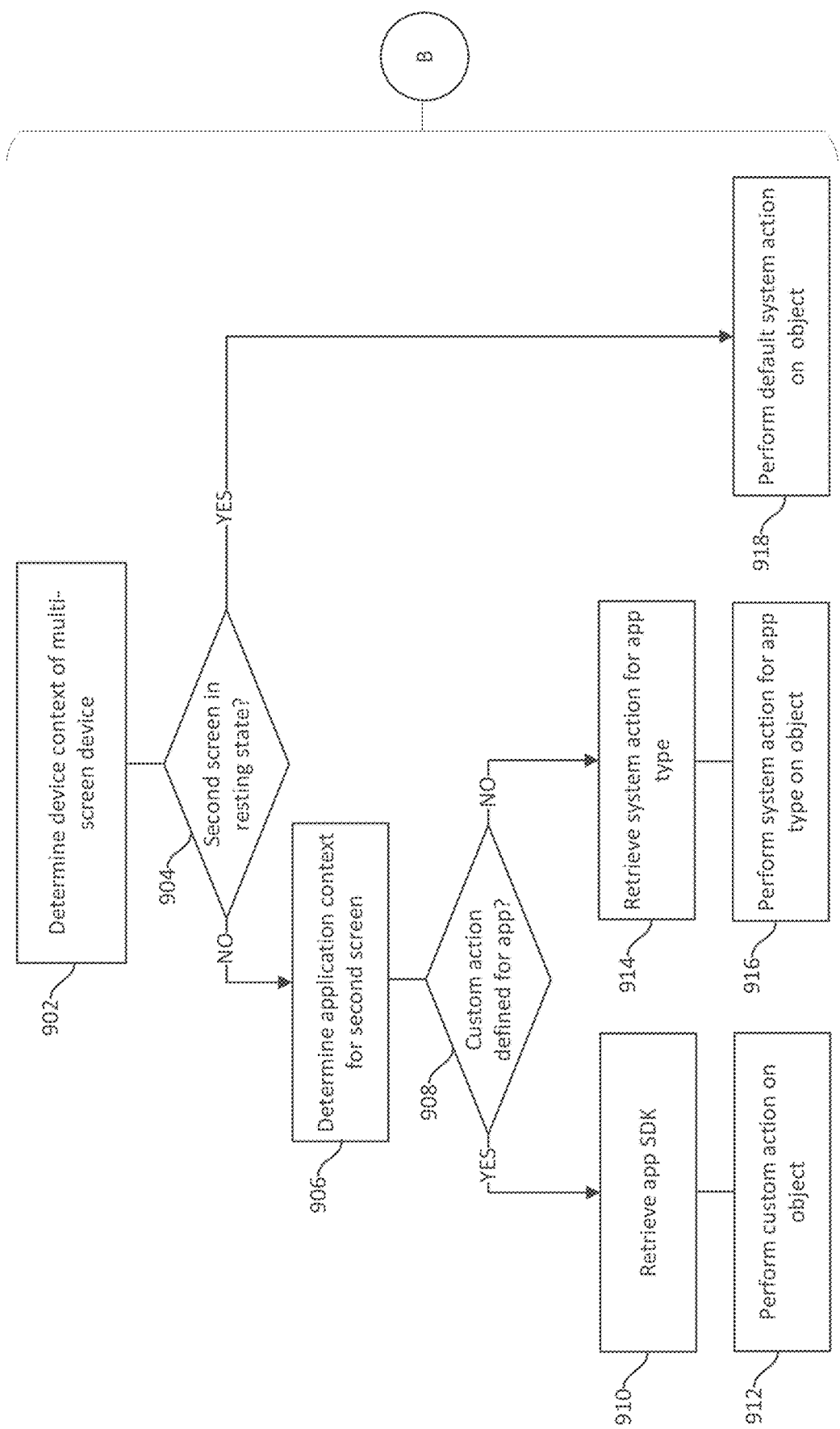
FIG. 9 illustrates an example method of determining a context of a gesture for a multi-screen device in accordance with aspects of the present disclosure.

In aspects, define gesture operation 702 and define action operation 704 are detailed further with respect to FIG. 8 (as indicated by "A") and determine context operation 712 and perform operation 714 are detailed further with respect to FIG. 9 (as indicated by "B").

As should be appreciated, operations 702-714 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 8 illustrates an example method of defining a gesture and one or more actions for a multi-screen device in accordance with aspects of the present disclosure.

A general order of the operations for the method 800 is shown in FIG. 8. Generally, the method 800 illustrates a sequence of operations for define gesture operation 702 and define action operation 704 of FIG. 7. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, an ASIC, an FPGA, a SOC or other hardware device. Hereinafter, the method 800 shall be explained with reference to the systems, components, devices, modules, software, data structures, data characteristic representations, signaling diagrams, methods, etc., described in conjunction with FIGS. 1-7, and 9-11B.

At receive operation 802, a definition for at least a first user motion of a gesture may be received. For example, the definition for the first user motion may be received from a system developer (e.g., system developer 104). In aspects, the system developer may encode the definition for the first user motion at an operating system level of the multi-screen device (e.g., multi-screen device 106). For a touch-enabled device, the first user motion may be a long press (e.g., a detected touch for a threshold period of time on the first screen of a multi-screen device), a double tap (e.g., two short touches on the first screen of a multi-screen device), and the like. Alternatively, the first user motion may be a "throw" motion (e.g., a touch in a quick sideways direction on the first screen towards the second screen of a multi-screen device) or a "sideways swipe" motion (e.g., a touch from a point on the first screen to an edge of the first screen adjacent to the second screen). In some cases, the gesture may be defined by a single user motion and the first user motion may comprise a throw motion; alternatively, the gesture may be defined by multiple user motions, e.g., a long press and then a throw motion.

At optional receive operation 804, a definition for a second user motion of the gesture may be received. For example, the definition for the second user motion may be received from a system developer (e.g., system developer 104). In aspects, the system developer may encode the definition for the second user motion at an operating system level of the multi-screen device (e.g., multi-screen device 106). For a touch-enabled device, the second user motion may be a "throw" motion (e.g., a touch in a quick sideways direction on the first screen towards the second screen of a multi-screen device) or a "sideways swipe" motion (e.g., a touch from a point on the first screen to an edge of the first screen adjacent to the second screen). In this case, the gesture may be defined by multiple user motions, e.g., a long press and then a throw motion.

At receive definition operation 806, a definition for a system action responsive to the gesture may be received. For instance, for a device context in which the second screen in the resting state, a system developer may define a system action responsive to the gesture. In aspects, the system action may be to "open" the object in the second screen.

At receive first action definition operation 808, a definition for a first action responsive to the gesture may be received. For instance, for a device context in which the second screen in the open state, the action performed on the object in the second screen may be based on an application context of the second screen. The definition for the first action may be received from a system developer and/or an app developer (e.g., via an app SDK for a particular application). The "application context" refers to the particular application that is open on the second screen as well as a state of the open application. For instance, the application context may refer to a type of application, such as a mail application, a document application, a presentation application, a calendar application, a task application, and the like. More specifically, the application context may refer to a particular application of an application type (e.g., Outlook® or Gmail® of a mail application type). Still more specifically, the application context may refer to the state of the particular application (or application type) that is open. An application state may refer to the feature of the application that is being accessed. For instance, for a mail application with an open interface displaying an inbox, the application state may be "inbox state." Alternatively, for a mail application with an open interface displaying sent items, the application state may be "sent state." Further still, for a mail application with an open interface for composing a mail message, the application state may be "compose state." In an example, the first action for a planner application with an open interface displaying a task list ("list state"), the first action may be to automatically create a new task interface including an attached object. In another example, the first action for a mail application in a compose state may be to automatically attach the object to an open mail message.

At receive second action definition operation 810, a definition for a second action responsive to the gesture may be received. As noted above, the action performed on the object in the second screen may be based on an application context of the second screen. The definition for the second action may be received from a system developer and/or an app developer (e.g., via an app SDK for a particular application). The "application context" refers to the particular application that is open on the second screen as well as an application state of the open application. For instance, the application context may refer to a type of application, such as a mail application, a document application, a presentation application, a calendar application, a task application, and the like. More specifically, the application context may refer to a particular application of an application type (e.g., Outlook® or Gmail® of a mail application type). Still more specifically, the application context may refer to the state of the particular application (or application type) that is open. An application state may refer to the feature of the application that is being accessed. For instance, for a calendar application with an open interface displaying a calendar week or a calendar month, the application state may be "calendar state." Alternatively, for a calendar application with an open interface for scheduling a meeting or an appointment, the application state may be "schedule state." In an example, the second action for a presentation application displaying a current slide may be to automatically insert (e.g., copy/past) the object into the current slide. In another example, the second action for a calendar application in a schedule state may be to automatically attach the object to an open appointment. After receiving the second action definition, the method may return to detect operation 706.

As should be appreciated, operations 802-810 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 9 illustrates an example method of determining a context of a gesture for a multi-screen device in accordance with aspects of the present disclosure.

A general order of the operations for the method 900 is shown in FIG. 9. Generally, the method 900 illustrates a sequence of operations for determine context operation 712 and perform operation 714 of FIG. 7. The method 900 may include more or fewer steps or may arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, an ASIC, an FPGA, a SOC or other hardware device. Hereinafter, the method 900 shall be explained with reference to the systems, components, devices, modules, software, data structures, data characteristic representations, signaling diagrams, methods, etc., described in conjunction with FIGS. 1-8, and 10-11B.

At determine device context operation 902, a device context of a multi-screen device may be determined. In aspects, a "device context" may refer to screen states for a multi-screen device. The multi-screen device may comprise at least a first screen in which a gesture is detected and a second screen. The screen states may include a "resting state" or an "open state" for each screen. In aspects, an application is "open" when the application has been launched and is available for user interaction within a screen of a multi-screen device. In the resting state, while no applications may be open, the screen may comprise system functionalities, such as date/time features, object icons, system icons (e.g., device settings), etc. For instance, the screen states for a dual-screen device may include a first screen state in combination with a second screen state. In this case, the first screen state is one of the resting state (the first screen having no open applications) or the open state (the first screen having a first open application), and the second screen state is one of the resting state (the second screen having no open applications) or the open state (the second screen having a second open application). For multi-screen devices having more than two screens, each screen may be either in a resting state or an open state, as described above.

At determination operation 904, it may be determined whether the second screen is in a resting state. In the second screen is in the resting state, the method may progress to perform default operation 918. If the second screen is not in the resting state, the method may progress to determine application context operation 906.

At determine application context operation 906, an application context for the second screen may be determined. In aspects, the "application context" refers to the particular application that is open in the second screen as well as a state of the open application. As should be appreciated, while the application context of the first screen may dictate the type of object that is identified (e.g., a document icon attached to a mail message of a mail application versus an image within content of a document application), the application context of the second screen determines the action to be performed on the object. The application context may refer to a type of application, such as a mail application, a document application, a presentation application, a calendar application, a task application, and the like. More specifically, the application context may refer to a particular application of an application type (e.g., Outlook® or Gmail® of a mail application type). Still more specifically, the application context may refer to the state of the particular application (or application type) that is open. An application state may refer to the feature of the application that is being accessed. For instance, for a mail application with an open interface displaying an inbox, the application state may be "inbox state." Alternatively, for a mail application with an open interface displaying sent items, the application state may be "sent state." Further still, for a mail application with an open interface for composing a mail message, the application state may be "compose state."

At determination operation 908, it may be determined whether a custom action is defined for the particular application associated with the application context of the second screen. As described above, a custom action responsive to a gesture may be defined by an app developer for the particular application in a particular application state. For instance, the custom action may be defined in a software development kit (SDK) for the particular application. If a custom action is defined for the particular application, the method may progress to retrieve SDK operation 910. If a custom action is not defined for the particular application, the method may progress to retrieve system operation 914.

At retrieve SDK operation 910, an app SDK for the particular application associated with the application context of the second screen may be retrieved. As detailed above, actions on objects for an application that is open in the second screen may differ based on the particular application and the particular application state. That is, the present application enables app developers to customize the action responsive to a gesture in the app SDK for a particular application and application state. That is, the developer may define different actions for different application states of a particular application.

At perform custom operation 912, a custom action defined for a particular application may be performed on an object in the second screen of a multi-screen device. For instance, based on an app SDK for a particular mail application in a compose state, the custom action may be to automatically attach an object to the open mail message; alternatively, for the particular mail application in the inbox state, the custom action may be to automatically create a new message with the attached object. Based on an app SDK for a different mail application, the custom action may be to create a new message with the attached object regardless of the application state. Based on an app SDK for a particular word processing application, the custom action may be to automatically copy and paste an object into an open document. Based on an app SDK for a particular task application in a compose state, the custom action may be to automatically attach an object to the open task; alternatively, in the list state, the custom action may be to automatically create a new task including the attached object. Based on an app SDK for a particular presentation application, the custom action may be to automatically copy and paste an object into a current slide of an open presentation or to copy and paste an object into a new slide of an open presentation. As should be appreciated, an app developer may specify any custom action in response to a detected gesture for a particular application and application state and the above examples are not intended to be limiting.

At retrieve system operation 914, a system action defined for a particular application type associated with the application context of the second screen may be retrieved. As detailed above, actions on objects for an application that is open in the second screen may differ based on the application type. That is, the present application enables a system developer to define a system action responsive to a gesture for a particular application type.

At perform system operation 916, a system action defined for an application type may be performed on an object in the second screen of a multi-screen device. For instance, for a mail type application, when there is an open mail message, the system action may be to automatically attach an object to the open mail message; alternatively, when there is not an open mail message, the system action may be to automatically create a new message with the attached object. For a word processing type application, the system action may be to automatically copy and paste an object into an open document. As should be appreciated, a system developer may specify any system action in response to a detected gesture based on an application type and the above examples are not intended to be limiting.

At perform default operation 918, a default action may be performed on an object in the second screen of a multi-screen device. For instance, if the second screen is in a resting state, the default action may be to open the object in the second screen. For instance, if the object is a document icon, the default action may be to open the document in the second screen. If the object is an image icon, the default action may be to display an image corresponding to the image icon in the second screen. As should be appreciated, a system developer may define a different default action when the second screen is in the resting state and the above examples are not intended to be limiting.

As should be appreciated, operations 902-918 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 10:
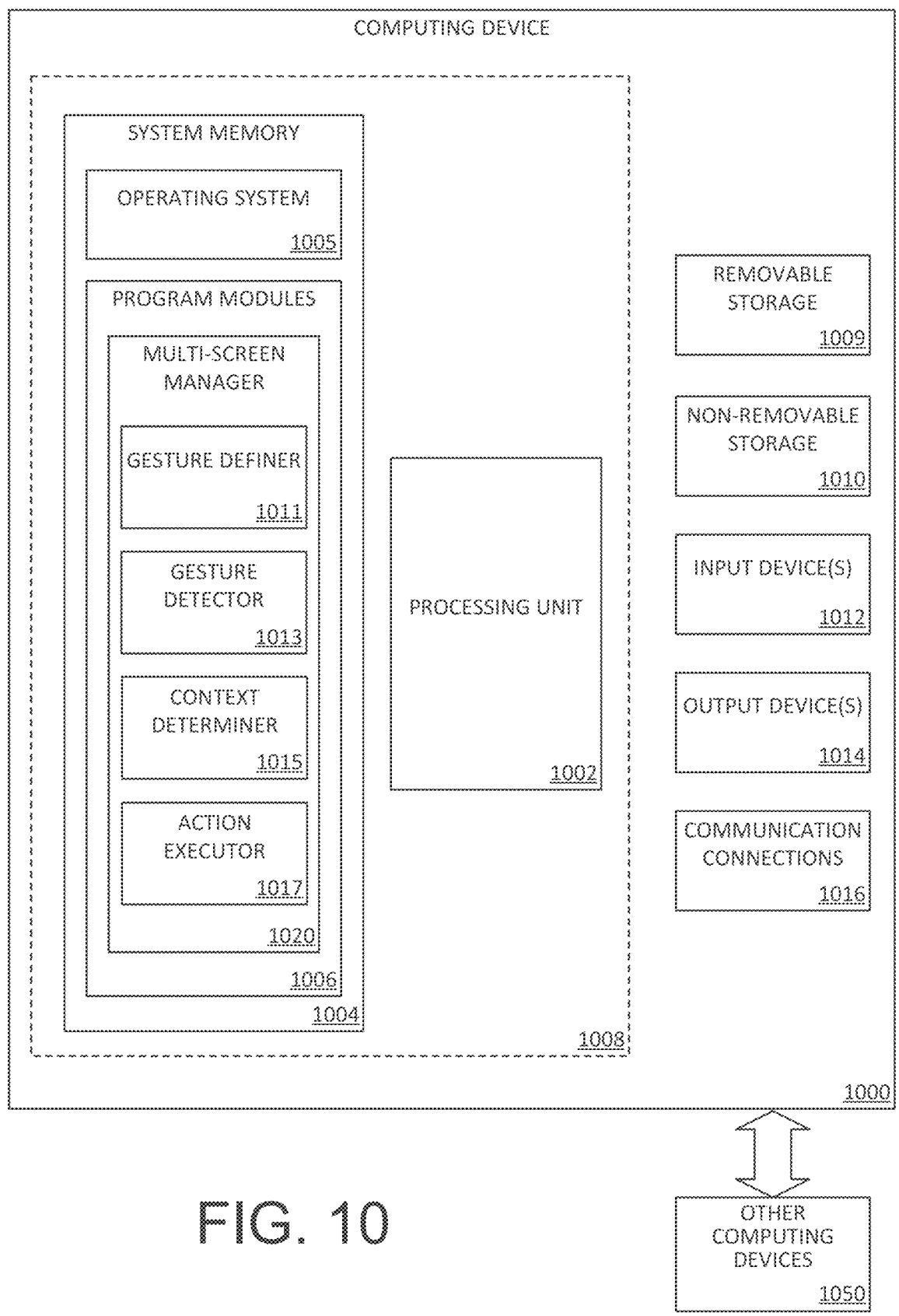
FIG. 10 is a block diagram illustrating physical components (e.g., hardware) of a computing device 1000 with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for implementing a multi-screen manager 1020 on a computing device (e.g., multi-screen device 106), including computer executable instructions for multi-screen manager 1020 that can be executed to implement the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running multi-screen manager 1020, such as one or more components with reference to FIG. 1 and, in particular, gesture definer 1011 (e.g., corresponding to gesture definer 112), gesture detector 1013 (e.g., corresponding to gesture detector 114 and object identifier 116), context determiner 1015 (e.g., corresponding to context determiner 118), and/or action executor 1017 (e.g., corresponding to action executor 120).

The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., multi-screen manager 1020) may perform processes including, but not limited to, the aspects as described herein. Other program modules that may be used in accordance with aspects of the present disclosure, and in particular for defining a gesture, may include gesture definer 1011, gesture detector 1013, context determiner 1015, and/or action executor 1017, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
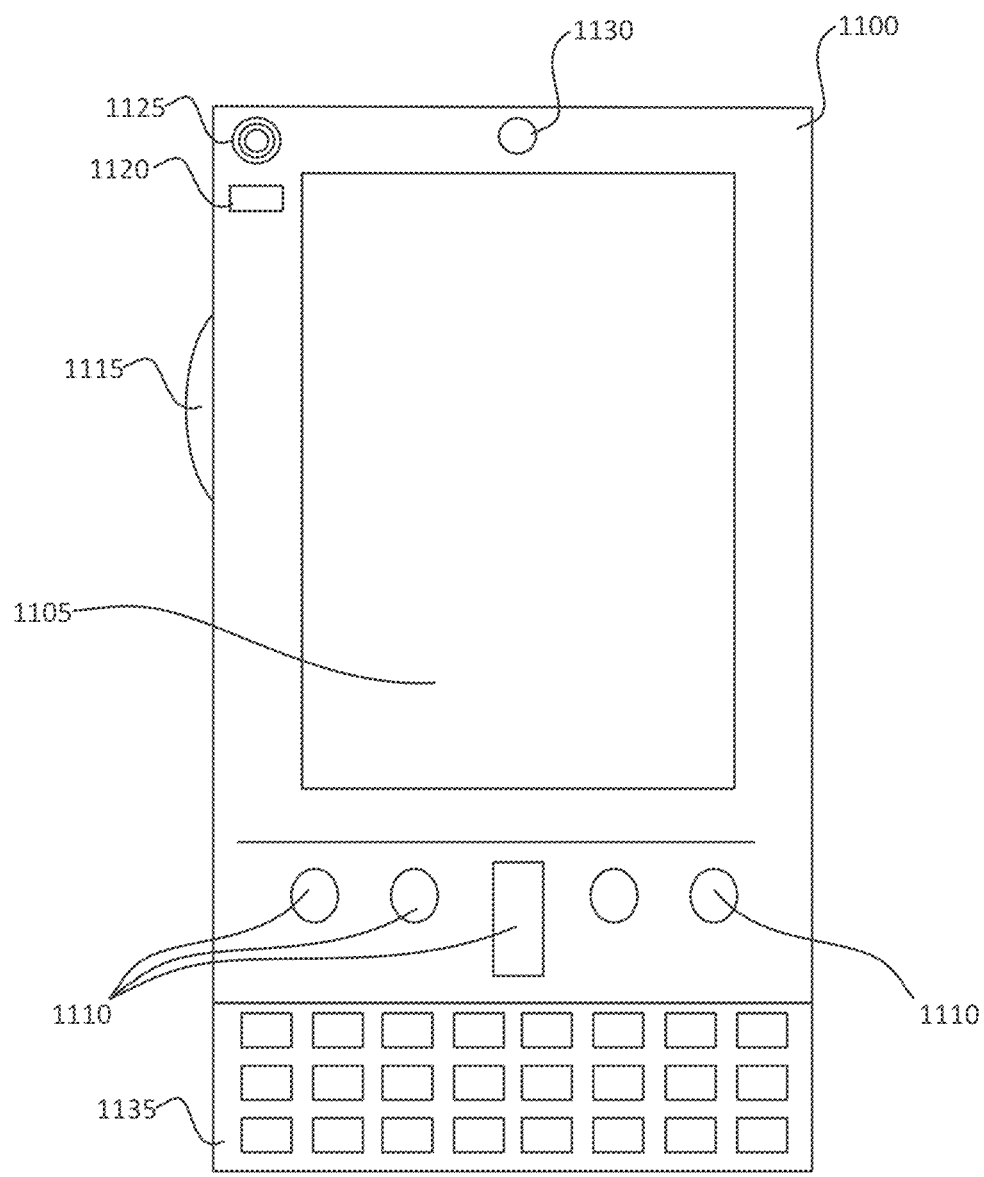
FIG. 11A is a simplified diagram of a mobile computing device with which aspects of the present disclosure may be practiced.
Figure 11B:
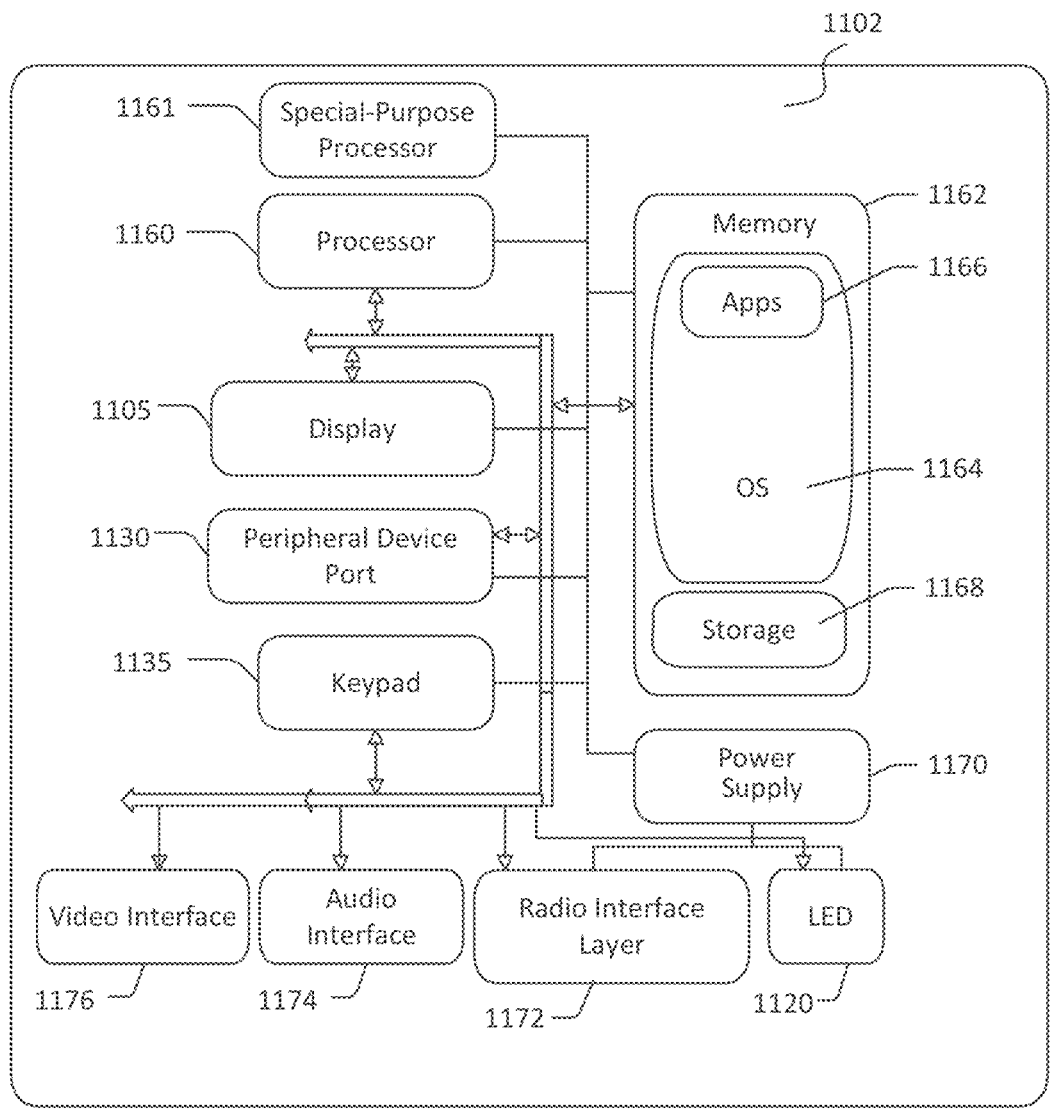
FIG. 11B is another simplified block diagram of a mobile computing device with which aspects of the present disclosure may be practiced.

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for providing a document history interface as described herein (e.g., event tracker, linker component, temporal synchronizer, presentation component, etc.).

The system 1102 has a power supply 1170, which may be implemented as one or more batteries. The power supply 1170 may further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 11A and 11B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for performing one or more actions responsive to a gesture on a multi-screen device, the method comprising:
    receiving a plurality of definitions for the gesture, including receiving at least:
        a first definition for the gesture customized for a first application in a first application context, wherein the first definition includes one or more motion inputs for initiating a first responsive action by the first application, wherein the first responsive action is customized for the first application context; and
        a second definition for the gesture customized for the first application in a second application context, wherein the second definition includes the one or more motion inputs for initiating a second responsive action by the first application, wherein the second responsive action is customized for the second application context;
    detecting the one or more motion inputs of the gesture on an object on a first screen of the multi-screen device, wherein the multi-screen device comprises at least two physically independent screens which are physically joined and communicatively coupled by an electronic connector;
    determining whether the first application is open on a second screen of the multi-screen device, wherein the first application is associated with the first application context; and
    responsive to detecting the gesture on the first screen and determining that the first application is open on the second screen, causing the first application to perform the first responsive action on the object in the second screen of the multi-screen device based on the first application context, wherein the first application is configured based on the second definition to perform the second responsive action on the object responsive to the gesture when the first application is associated with the second application context.

2. The computer-implemented method of claim 1, wherein the first application context comprises a first application state.

3. The computer-implemented method of claim 1, further comprising:
when the first application is in the second application context, retrieving the second definition for causing the first application to perform the second responsive action on the object.

4. The computer-implemented method of claim 1, wherein when the first application is not open in the second screen, the method further comprises:
opening the object in the second screen.

5. The computer-implemented method of claim 1, wherein when a second application is open in the second screen, the method further comprises:
retrieving a third definition for causing the second application to perform a third responsive action on the object in the second screen.

6. The computer-implemented method of claim 1, wherein the first responsive action is one of:
attaching the object; and
cutting and pasting the object.

7. The computer-implemented method of claim 1, wherein the gesture is a throw gesture, and wherein the throw gesture comprises at least one motion input.

8. The computer-implemented method of claim 7, wherein the at least one motion input comprises a touch in a sideways direction received at the first screen towards the second screen.

9. The computer-implemented method of claim 1, wherein the gesture comprises a plurality of motion inputs.

10. The computer-implemented method of claim 9, wherein the plurality of motion inputs comprise a long press motion and a throw motion.

11. The computer-implemented method of claim 10, wherein the throw motion is a sideways motion received at the first screen in a direction of the second screen.

12. A system, comprising:
at least one processor; and
at least one memory storing computer-executable instructions that when executed by the at least one processor cause the system to perform operations, comprising:
receive a plurality of definitions for a gesture, including receiving at least:
a first definition for the gesture customized for an application in a first application context, wherein the first definition includes one or more motion inputs for initiating a first responsive action by the application, wherein the first responsive action is customized for the first application context; and
a second definition for the gesture customized for the application in a second application context, wherein the second definition includes the one or more motion inputs for initiating a second responsive action by the application, wherein the second responsive action is customized for the second application context;
detect the one or more motion inputs of the gesture on an object on a first screen of the multi-screen device, wherein the multi-screen device comprises at least two physically independent screens which are physically joined and communicatively coupled by an electronic connector;
determine whether the application is open on a second screen of the multi-screen device, wherein the application is associated with the first application context; and
responsive to the detection of the gesture on the first screen and the determination of the first application being open on the second screen, causing the application to perform the first responsive action on the object in the second screen of the multi-screen device based on the first application context, wherein the first application is configured based on the second definition to perform the second responsive action on the object responsive to the gesture when the application is associated with the second application context.

13. The system of claim 12, wherein the gesture is a throw gesture, and wherein at least one motion input of the throw gesture includes a touch in a sideways direction received on the first screen towards the second screen of the multi-screen device.

14. The system of claim 12, wherein when the application is in the first application context, retrieving the first definition for causing the application to perform the first responsive action.

15. The system of claim 14, wherein when the application is in the second application context, retrieve the second definition for causing the application to perform the second responsive action.

16. The system of claim 13, wherein the at least one motion input comprises a throw motion received at the first screen in a direction of the second screen.

17. A computer storage medium storing computer-executable instructions that when executed by a processor cause a computer system to perform operations, comprising:
receive a plurality of definitions for a gesture, including receiving at least:
a first definition for the gesture customized for an application in a first application context, wherein the first definition includes one or more motion inputs for initiating a first responsive action by the application, wherein the first responsive action is customized for the first application context; and
a second definition for the gesture customized for the application in a second application context, wherein the second definition includes the one or more motion inputs for initiating a second responsive action by the application, wherein the second responsive action is customized for the second application context;
detect the one or more motion inputs of the gesture on an object on a first screen of the multi-screen device, wherein the multi-screen device comprises at least two physically independent screens which are physically joined and communicatively coupled by an electronic connector;
determine whether the application is open on a second screen of the multi-screen device, wherein the application is associated with the first application context;
based on the application being associated with the first application context, retrieve the first definition for the gesture; and
responsive to the detection of the gesture on the first screen and the determination of the first application being open on the second screen, cause the application to perform the first responsive action on the object in the second screen of the multi-screen device based on the first definition, wherein when the application is associated with the second application context the application is configured to perform the second responsive action on the object based on the second definition.

18. The computer storage medium of claim 17, wherein the first application context include a first application state.

19. The computer storage medium of claim 17, wherein the first responsive action is defined in a software development kit (SDK) for the first application.

20. The computer storage medium of claim 17, wherein the gesture is a throw gesture, and wherein at least one motion input of the throw gesture includes a touch in a sideways direction received on the first screen of the multi-screen device.

* * * * *